(12) United States Patent
Chai et al.

(10) Patent No.: US 12,414,152 B2
(45) Date of Patent: Sep. 9, 2025

(54) UPLINK DATA TRANSMISSION METHOD AND APPARATUS

(71) Applicant: HUAWEI TECHNOLOGIES CO., LTD., Guangdong (CN)

(72) Inventors: Xiaomeng Chai, Shanghai (CN); Yiqun Wu, Shanghai (CN); Xiuqiang Xu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 504 days.

(21) Appl. No.: 17/941,080

(22) Filed: Sep. 9, 2022

(65) Prior Publication Data
US 2023/0012686 A1 Jan. 19, 2023

Related U.S. Application Data

(63) Continuation of application No. PCT/CN2021/079735, filed on Mar. 9, 2021.

(30) Foreign Application Priority Data

Mar. 11, 2020 (CN) .......................... 202010167233.6

(51) Int. Cl.
*H04W 74/00* (2009.01)
*H04W 74/08* (2009.01)
*H04W 74/0833* (2024.01)

(52) U.S. Cl.
CPC ..... *H04W 74/004* (2013.01); *H04W 74/0833* (2013.01); *H04W 74/0866* (2013.01)

(58) Field of Classification Search
None
See application file for complete search history.

(56) References Cited

U.S. PATENT DOCUMENTS

| | | | | |
|---|---|---|---|---|
| 11,228,990 B2* | 1/2022 | Jeon | ...................... | H04W 52/50 |
| 11,252,765 B2* | 2/2022 | Jeon | .................... | H04W 74/004 |
| 11,412,550 B2* | 8/2022 | Jeon | ...................... | H04L 1/1642 |
| 11,438,931 B2* | 9/2022 | Rastegardoost | ...... | H04W 74/04 |

(Continued)

FOREIGN PATENT DOCUMENTS

| | | |
|---|---|---|
| CN | 109392129 A | 2/2019 |
| CN | 110312312 A | 10/2019 |

(Continued)

OTHER PUBLICATIONS

Extended European Search Report dated Apr. 12, 2023 issued for European Application No. 21768683.1 (10 pages).

(Continued)

*Primary Examiner* — Faiyazkhan Ghafoerkhan

(57) ABSTRACT

An uplink data transmission method and an apparatus include or relate to a terminal device which determines, based on indication information of a network device, a time-frequency resource corresponding to a random access resource, or a part of a time frequency resource in the random access resource, to directly transmit uplink data. Configuration information of a time-frequency resource for random access may be reused for configuration information of the time-frequency resource, so that signaling overheads are reduced and a resource utilization is improved.

14 Claims, 8 Drawing Sheets

(56) References Cited

U.S. PATENT DOCUMENTS

| | | | | |
|---|---|---|---|---|
| 11,523,441 | B2* | 12/2022 | Jeon | H04W 74/0841 |
| 11,558,891 | B2* | 1/2023 | Jeon | H04W 74/0833 |
| 11,641,692 | B2* | 5/2023 | Jeon | H04L 1/0015 370/329 |
| 11,653,393 | B2* | 5/2023 | Rastegardoost | H04W 56/0045 370/329 |
| 11,683,846 | B2* | 6/2023 | Jeon | H04W 74/0841 370/329 |
| 11,778,657 | B2* | 10/2023 | Davydov | H04L 5/0091 370/330 |
| 11,785,650 | B2* | 10/2023 | Jeon | H04W 76/11 370/329 |
| 11,985,706 | B2* | 5/2024 | Jeon | H04W 74/08 |
| 12,219,615 | B2* | 2/2025 | Kim | H04W 72/0453 |
| 2020/0178315 | A1* | 6/2020 | Li | H04W 16/14 |
| 2020/0281026 | A1* | 9/2020 | Yan | H04L 5/0053 |
| 2020/0314913 | A1* | 10/2020 | Rastegardoost | H04W 74/04 |
| 2020/0314917 | A1* | 10/2020 | Jeon | H04W 74/08 |
| 2020/0351801 | A1* | 11/2020 | Jeon | H04W 52/48 |
| 2020/0351955 | A1* | 11/2020 | Jeon | H04W 76/27 |
| 2021/0051672 | A1* | 2/2021 | Rastegardoost | H04W 74/006 |
| 2021/0051736 | A1* | 2/2021 | Jeon | H04W 76/11 |
| 2021/0144742 | A1* | 5/2021 | Jeon | H04W 74/0833 |
| 2022/0078856 | A1* | 3/2022 | Jeon | H04L 5/0055 |
| 2022/0110184 | A1* | 4/2022 | Jeon | H04W 74/0841 |
| 2022/0167279 | A1* | 5/2022 | Zhou | H04W 52/146 |
| 2022/0201773 | A1* | 6/2022 | Jeon | H04W 74/0858 |
| 2022/0287107 | A1* | 9/2022 | Kim | H04W 72/0453 |
| 2022/0353922 | A1* | 11/2022 | Rastegardoost | H04W 74/006 |
| 2023/0012686 | A1* | 1/2023 | Chai | H04W 74/0833 |
| 2023/0269823 | A1* | 8/2023 | Jeon | H04W 74/0833 370/329 |
| 2024/0357512 | A1* | 10/2024 | Zhou | H04W 52/16 |
| 2024/0373470 | A1* | 11/2024 | Jeon | H04W 74/0833 |

FOREIGN PATENT DOCUMENTS

| | | |
|---|---|---|
| CN | 110831066 A | 2/2020 |
| WO | 2019029321 A1 | 2/2019 |
| WO | 2019096312 A1 | 5/2019 |
| WO | 2019099443 A1 | 5/2019 |

OTHER PUBLICATIONS

Ericsson, Use of 2-step resources on different BWPs. 3GPP TSG-RAN WG2 #109 electronic, Elbonia, Feb. 24 Mar. 6, 2020, R2-2000391, 4 pages.

* cited by examiner

UPLINK DATA TRANSMISSION METHOD AND APPARATUS

CROSS-REFERENCE TO RELATED APPLICATIONS

This application is a continuation of International Application No. PCT/CN2021/079735, filed on Mar. 9, 2021, which claims priority to Chinese Patent Application No. 202010167233.6, filed on Mar. 11, 2020. The disclosures of the aforementioned applications are hereby incorporated by reference in their entireties.

TECHNICAL FIELD

Embodiments of this disclosure relate to the wireless communication field, and in particular, to an uplink data transmission method and an apparatus.

BACKGROUND

With development of communication technologies and increase of user requirements, a large number of terminal devices in a plurality of forms are gradually used in communication scenarios. For example, in an industrial automation scenario, there are a large quantity of monitoring devices, machines, sensors, and the like in factories; and in a home and life scenario, there are a large quantity of mobile phones, tablet computers, wearable devices, smart appliances, vehicle-mounted terminal devices, and the like.

SUMMARY

Embodiments of this disclosure provide an uplink data transmission method, to reduce signaling overheads and improve a resource utilization.

According to a first aspect, an uplink data transmission method is provided. The method is performed by a terminal device or a module in the terminal device. An example in which the terminal device is an execution body is used herein for description. The terminal device receives first indication information from a network device. The terminal device determines a first uplink time-frequency resource based on the first indication information and configuration information of a second uplink time-frequency resource, where the first uplink time-frequency resource is a time-frequency resource of an uplink data channel, and the second uplink time-frequency resource is for random access. The terminal device sends uplink data to the network device on a third uplink time-frequency resource, where the third uplink time-frequency resource is a part or all of the first uplink time-frequency resource.

By implementing the method described in the first aspect, the terminal device determines, based on indication information of the network device, a time-frequency resource that is of an uplink data channel and that corresponds to a random access resource, where the time-frequency resource may be used to directly transmit the uplink data. Configuration information of the random access resource may be reused for configuration information of the time-frequency resource, so that signaling overheads are reduced and a resource utilization is improved.

According to a second aspect, an uplink data transmission method is provided. The method is performed by a network device or a module in the network device. An example in which the network device is an execution body is used herein for description. The network device sends first indication information to a terminal device. The network device determines a first uplink time-frequency resource based on the first indication information and configuration information of a second uplink time-frequency resource, where the first uplink time-frequency resource is a time-frequency resource of an uplink data channel, and the second uplink time-frequency resource is for random access. The network device receives uplink data from the terminal device on a third uplink time-frequency resource, where the third uplink time-frequency resource is a part or all of the first uplink time-frequency resource.

The method described in the second aspect is a network-side method corresponding to the method described in the first aspect. Therefore, beneficial effects in the first aspect can also be achieved.

In a possible implementation of the first aspect or the second aspect, the first indication information includes an offset value, and the offset value is a time-domain offset value or a frequency-domain offset value of the first uplink time-frequency resource relative to the second uplink time-frequency resource.

In a possible implementation of the first aspect or the second aspect, the second uplink time-frequency resource is a physical uplink shared channel occasion, and the physical uplink shared channel occasion is for carrying uplink data.

In a possible implementation of the first aspect or the second aspect, the determining a first uplink time-frequency resource based on the first indication information and configuration information of a second uplink time-frequency resource specifically includes: determining the first uplink time-frequency resource based on the offset value and the configuration information of the second uplink time-frequency resource.

By implementing the foregoing method, corresponding parameters in the configuration information of the second uplink time-frequency resource may be reused for all parameters of the first uplink time-frequency resource. The network device only needs to indicate, to the terminal device using the first indication information, the time-domain offset value or the frequency-domain offset value of the first uplink time-frequency resource relative to the second uplink time-frequency resource. The terminal device may reuse the configuration information of the second uplink time-frequency resource for determining the first uplink time-frequency resource, so that signaling overheads of resource configuration information can be reduced, and a resource utilization can be improved.

In a possible implementation of the first aspect or the second aspect, the second uplink time-frequency resource is a physical random access channel occasion, and the physical random access channel occasion is for carrying a random access preamble.

In a possible implementation of the first aspect or the second aspect, the determining a first uplink time-frequency resource based on the first indication information and configuration information of a second uplink time-frequency resource specifically includes: determining the first uplink time-frequency resource based on the offset value, the configuration information of the second uplink time-frequency resource, and configuration information of a physical uplink shared channel occasion.

By implementing the foregoing method, corresponding parameters in the configuration information of the physical uplink shared channel occasion may be reused for all parameters of the first uplink time-frequency resource. The network device only needs to indicate, to the terminal device using the first indication information, the time-domain offset value or the frequency-domain offset value of the first uplink time-frequency resource relative to the second uplink time-frequency resource. The terminal device may reuse the configuration information of the physical uplink shared channel occasion for determining the first uplink time-frequency resource, so that signaling overheads of resource configuration information can be reduced, and a resource utilization can be improved.

In a possible implementation of the first aspect or the second aspect, the first indication information further includes configuration information of the first uplink time-frequency resource; and the determining a first uplink time-frequency resource based on the first indication information and configuration information of a second uplink time-frequency resource specifically includes: determining the first uplink time-frequency resource based on the offset value, the configuration information of the first uplink time-frequency resource, and the configuration information of the second uplink time-frequency resource.

By implementing the method, for determining the first uplink time-frequency resource, the terminal device may reuse configuration information other than the configuration information of the first uplink time-frequency resource in the configuration information of the second uplink time-frequency resource, or may reuse configuration information other than the configuration information of the first uplink time-frequency resource in the configuration information of the physical uplink shared channel occasion, so that the signaling overheads of the resource configuration information are reduced, and the resource utilization is improved. In addition, the first indication information may further include the configuration information of the first uplink time-frequency resource, as well as the offset value. This improves resource configuration flexibility.

In a possible implementation of the first aspect or the second aspect, the second uplink time-frequency resource is the physical uplink shared channel occasion, the physical uplink shared channel occasion is for carrying uplink data, and the first uplink time-frequency resource is a part or all of the second uplink time-frequency resource.

In a possible implementation of the first aspect or the second aspect, the first indication information indicates a location of the first uplink time-frequency resource in the second uplink time-frequency resource; and the determining a first uplink time-frequency resource based on the first indication information and configuration information of a second uplink time-frequency resource specifically includes: determining the first uplink time-frequency resource based on the location of the first uplink time-frequency resource in the second uplink time-frequency resource and the configuration information of the second uplink time-frequency resource.

In a possible implementation of the first aspect or the second aspect, the first indication information indicates a demodulation reference signal DMRS associated with the first uplink time-frequency resource in DMRSs of the second uplink time-frequency resource; and the determining a first uplink time-frequency resource based on the first indication information and configuration information of a second uplink time-frequency resource specifically includes: determining, based on the first indication information and the configuration information of the second uplink time-frequency resource, the DMRS associated with the first uplink time-frequency resource, and determining the first uplink time-frequency resource based on the DMRS associated with the first uplink time-frequency resource.

In a possible implementation of the first aspect or the second aspect, the second uplink time-frequency resource is the physical random access channel occasion, the physical random access channel occasion is for carrying the random access preamble, and the first uplink time-frequency resource is physical uplink shared channel occasions associated with a part or all of physical random access channel occasions in the second uplink time-frequency resource.

In a possible implementation of the first aspect or the second aspect, the first indication information indicates a location, in the second uplink time-frequency resource, of a physical random access channel occasion associated with the first uplink time-frequency resource; and the determining a first uplink time-frequency resource based on the first indication information and configuration information of a second uplink time-frequency resource specifically includes: determining, based on the first indication information and the configuration information of the second uplink time-frequency resource, the physical random access channel occasion associated with the first uplink time-frequency resource, and determining the first uplink time-frequency resource based on the physical random access channel occasion associated with the first uplink time-frequency resource.

In a possible implementation of the first aspect or the second aspect, the first indication information indicates a random access preamble associated with the first uplink time-frequency resource in random access preambles carried on the second uplink time-frequency resource; and the determining a first uplink time-frequency resource based on the first indication information and configuration information of a second uplink time-frequency resource specifically includes: determining, based on the first indication information and the configuration information of the second uplink time-frequency resource, the random access preamble associated with the first uplink time-frequency resource, and determining the first uplink time-frequency resource based on the random access preamble associated with the first uplink time-frequency resource.

By implementing the foregoing method, the network device indicates a part of a time-frequency resource (namely, the first uplink time-frequency resource) in a random access resource to the terminal device, and the terminal device can directly send the uplink data to the network device on the first uplink time-frequency resource, without a need to send the random access preamble on the physical random access channel occasion associated with the first uplink time-frequency resource. Configuring a part of the random access resource as a time-frequency resource that can be used to directly transmit uplink data improves spectrum efficiency.

In a possible implementation of the first aspect or the second aspect, the third uplink time-frequency resource is a part or all of a valid uplink time-frequency resource in the first uplink time-frequency resource, and the valid uplink time-frequency resource in the first uplink time-frequency resource is a time-frequency resource that meets at least one condition in a first condition set in the first uplink time-frequency resource.

By implementing the method, the terminal device can send the uplink data to the network device on the valid uplink time-frequency resource, so that data transmission reliability is improved.

In a possible implementation of the first aspect, the uplink data is uplink data scrambled using a radio network temporary identifier RNTI, and the RNTI is an RNTI determined by the terminal device based on the third uplink time-frequency resource.

In a possible implementation of the second aspect, the uplink data is uplink data scrambled using a radio network temporary identifier RNTI, the RNTI is determined based on the third uplink time-frequency resource, and the uplink data is descrambled using the RNTI.

By implementing the foregoing method, for receiving the uplink data, the network device may determine, based on the third uplink time-frequency resource carrying the uplink data, the RNTI for scrambling the uplink data, with no need to traverse possible RNTIs to descramble the uplink data. This reduces receiving complexity of the network device.

In a possible implementation of the second aspect, the network device determines, based on the third uplink time-frequency resource and an association relationship between the first uplink time-frequency resource and a synchronization signal and PBCH block (SSB) set, an SSB associated with the third uplink time-frequency resource, where the SSB is for sending feedback information of the uplink data.

In a possible implementation of the second aspect, the association relationship between the first uplink time-frequency resource and the SSB set is an association relationship between a physical uplink shared channel PUSCH resource in the first uplink time-frequency resource and the SSB set, and/or an association relationship between a demodulation reference signal DMRS of the first uplink time-frequency resource and the SSB set.

In a possible implementation of the second aspect, the association relationship between the first uplink time-frequency resource and the SSB set is an association relationship between the first uplink time-frequency resource and a physical random access channel resource, and an association relationship between the physical random access channel resource and the SSB set.

By implementing the method, the network device determines, based on the association relationship between the first uplink time-frequency resource and the SSB set, the SSB for sending the feedback information of the uplink data. In other words, the network device determines, based on the association relationship, a beam for sending the feedback information of the uplink data, to improve data transmission reliability.

According to a third aspect, a communication apparatus is provided. The apparatus may be a terminal device, an apparatus in the terminal device, or an apparatus that can be used together with the terminal device. In an implementation, the apparatus includes a module that can perform the corresponding method/operation/step/action described in any one of the first aspect or the possible implementations of the first aspect. The module may be implemented by a hardware circuit, software, or a combination of a hardware circuit and software. In an implementation, the apparatus may include a processing module and a communication module.

According to a fourth aspect, a communication apparatus is provided. The apparatus may be a network device, an apparatus in the network device, or an apparatus that can be used together with the network device. In an implementation, the apparatus includes a module configured to perform the corresponding method/operation/step/action described in any one of the second aspect or the possible implementations of the second aspect. The module may be implemented by a hardware circuit, software, or a combination of a hardware circuit and software. In an implementation, the apparatus may include a processing module and a communication module.

According to a fifth aspect, a communication apparatus is provided. The apparatus includes a processor, configured to implement the method in any one of the first aspect or the possible implementations of the first aspect. Optionally, the apparatus includes a memory, configured to store instructions and/or data. The memory is coupled to the processor. When executing the instructions stored in the memory, the processor may implement the method in any one of the first aspect or the possible implementations of the first aspect. The apparatus may further include a communication interface. The communication interface is configured to receive and send information or data. For example, the communication interface may be a transceiver, an interface circuit, a bus, a module, a pin, or a communication interface of another type.

In a possible implementation, the communication apparatus includes the processor and the interface circuit. The interface circuit is configured to: receive a signal from a communication apparatus other than the communication apparatus and transmit the signal to the processor, or send a signal from the processor to a communication apparatus other than the communication apparatus. The processor is configured to implement the method in any one of the first aspect or the possible implementations of the first aspect using a logic circuit or executing code instructions.

According to a sixth aspect, a communication apparatus is provided. The apparatus includes a processor, configured to implement the method in any one of the second aspect or the possible implementations of the second aspect. Optionally, the apparatus includes a memory, configured to store instructions and/or data. The memory is coupled to the processor. When executing the instructions stored in the memory, the processor may implement the method in any one of the second aspect or the possible implementations of the second aspect. The apparatus may further include a communication interface. The communication interface is configured to receive and send information or data. For example, the communication interface may be a transceiver, an interface circuit, a bus, a module, a pin, or a communication interface of another type.

In a possible implementation, the communication apparatus includes the processor and the interface circuit. The interface circuit is configured to: receive a signal from a communication apparatus other than the communication apparatus and transmit the signal to the processor, or send a signal from the processor to a communication apparatus other than the communication apparatus. The processor is configured to implement the method in any one of the second aspect or the possible implementations of the second aspect using a logic circuit or executing code instructions.

According to a seventh aspect, a computer-readable storage medium is provided. The computer-readable storage medium stores a computer program or instructions. When the computer program or the instructions are executed, the method in any one of the first aspect or the possible implementations of the first aspect is implemented.

According to an eighth aspect, a computer-readable storage medium is provided. The computer-readable storage medium stores a computer program or instructions. When the computer program or the instructions are executed, the method in any one of the second aspect or the possible implementations of the second aspect is implemented.

According to a ninth aspect, a computer program product including instructions is provided. When the instructions are run, the method in any one of the first aspect or the possible implementations of the first aspect is implemented.

According to a tenth aspect, a computer program product including instructions is provided. When the instructions are run, the method in any one of the second aspect or the possible implementations of the second aspect is implemented.

According to an eleventh aspect, a computer program is provided. The computer program includes code or instructions. When the code or the instructions are run, the method in any one of the first aspect or the possible implementations of the first aspect is implemented.

According to a twelfth aspect, a computer program is provided. The computer program includes code or instructions. When the code or the instructions are run, the method in any one of the second aspect or the possible implementations of the second aspect is implemented.

According to a thirteenth aspect, a chip system is provided. The chip system includes a processor, may further include a memory, and is configured to implement at least one method described in the first aspect to the eighth aspect. The chip system may include a chip, or may include a chip and another discrete component.

According to a fourteenth aspect, a communication system is provided. The system includes the apparatus (for example, the terminal device) described in the third aspect or the fifth aspect and the apparatus (for example, the network device) described in the fourth aspect or the sixth aspect.

DESCRIPTION OF EMBODIMENTS

Figure 1:
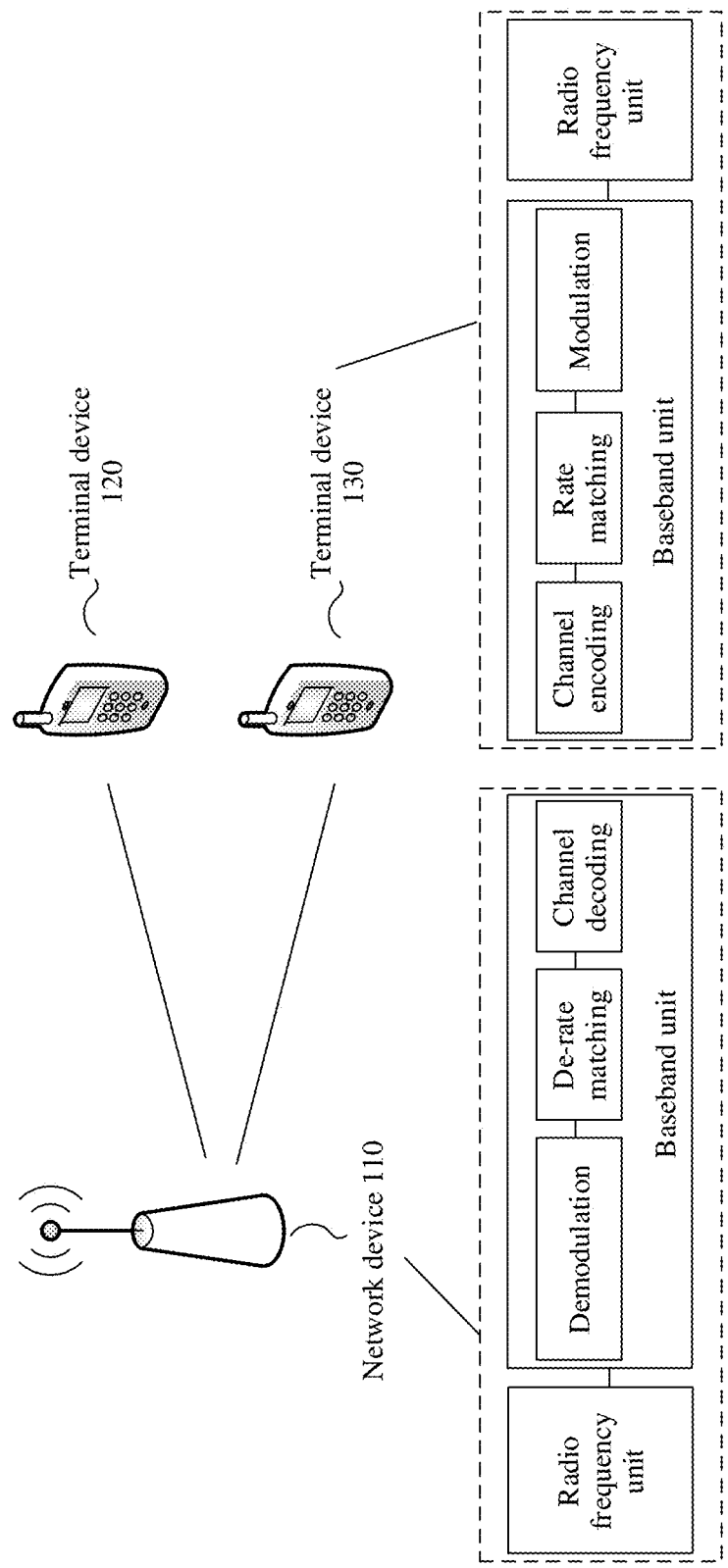
FIG. 1 is a schematic diagram of an architecture of a communication system to which embodiments of this disclosure are applied.

Technical solutions provided in embodiments of this disclosure may be applied to various communication systems, for example, a long term evolution (LTE) system, a 5th generation (5G) mobile communication system, a wireless fidelity (Wi-Fi) system, a future communication system, a system integrating a plurality of communication systems, or the like. This is not limited in embodiments of this disclosure. 5G may also be referred to as new radio (NR).

The technical solutions provided in embodiments of this disclosure may be applied to one or more of the following communication scenarios: enhanced mobile broadband (eMBB), ultra-reliable low-latency communication (URLLC), machine type communication (MTC), massive machine-type communications (mMTC), device-to-device (D2D), vehicle to everything (V2X), vehicle to vehicle (V2V), Internet of Things (IoT), and the like.

The technical solutions provided in embodiments of this disclosure may be applied to communication between communication devices. The communication between communication devices may include communication between a network device and a terminal device, communication between network devices, and/or communication between terminal devices. In embodiments of this disclosure, the term "communication" may also be described as "transmission", "information transmission", "signal transmission", or the like. The transmission may include sending and/or receiving. In embodiments of this disclosure, the communication between a network device and a terminal device is used as an example to describe the technical solutions. A person skilled in the art may also apply the technical solutions to other communication between a scheduling entity and a subordinate entity, for example, communication between a macro base station and a micro base station, for example, communication between a first terminal device and a second terminal device. The scheduling entity may allocate air interface resources to the subordinate entity. The air interface resources include one or more of the following resources: time-domain resources, frequency-domain resources, code resources, and spatial resources. In embodiments of this disclosure, "a plurality of types" may be two types, three types, four types, or more types. This is not limited in embodiments of this disclosure.

In embodiments of this disclosure, the communication between a network device and a terminal device includes: The network device sends a downlink signal/downlink information to the terminal device, and/or the terminal device sends an uplink signal/uplink information to the network device.

In embodiments of this disclosure, "/" may represent an "or" relationship between associated objects. For example, A/B may represent A or B. "and/or" may be used to indicate that there are three relationships between the associated objects. For example, A and/or B may represent the following three cases: Only A exists, both A and B exist, and only B exists. A and B may be singular or plural. In embodiments of this disclosure, terms such as "first" or "second" may be used to distinguish between technical features with a same or similar function. The terms such as "first" or "second" do not limit a quantity and an execution sequence, and the terms such as "first" or "second" do not indicate a definite difference. In embodiments of this disclosure, terms such as "example" or "for example" are used to represent giving an example, an illustration, or a description. Any embodiment or design scheme described as "example" or "for example" should not be explained as being more preferred or advantageous over other embodiments or design scheme. Use of the terms such as "example" or "for example" is intended to present a related concept in a specific manner for ease of understanding.

FIG. 1 is a schematic diagram of an architecture of a communication system to which embodiments of this disclosure may be applied. As shown in FIG. 1, the communication system includes a network device 110 and at least one terminal device (for example, a terminal device 120 and a terminal device 130 shown in FIG. 1). For example, the network device 110 may include a radio frequency unit and a baseband unit. For uplink data transmission, the baseband unit may include at least one of the following modules: a demodulation module, a de-rate matching module, and a channel decoding module. For example, the terminal device (for example, the terminal device 120 and the terminal device 130 shown in FIG. 1) may include a baseband unit and a radio frequency unit. For uplink data transmission, the baseband unit may include at least one of the following modules: a channel encoding module, a rate matching module, and a modulation module. The channel encoding module may be implemented using an encoder. The encoder is configured to encode an information bit sequence and generate an encoded bit sequence, where the encoded bit sequence includes an information bit and a redundant bit. The rate matching module is configured to repeat or puncture bits in the encoded bit sequence, so that a length of a bit sequence obtained through rate matching matches a transmission resource. The modulation module is configured to modulate and map the bit sequence obtained through rate matching to complex-valued modulation symbols, to improve transmission efficiency. The demodulation module, the de-rate matching module, and the channel decoding module perform inverse processes of functions of the modulation module, the rate matching module, and the channel encoding module respectively. FIG. 1 is merely a schematic diagram. Quantities of network devices and terminal devices included in the communication system are not limited in embodiments of this disclosure.

The network device and the terminal device may be deployed on land, including an indoor device, an outdoor device, a handheld device, or a vehicle-mounted device; may be deployed on a water surface; or may be deployed on a plane, a balloon, and a satellite in the air. Application scenarios of the network device and the terminal device are not limited in embodiments of this disclosure.

Communication between the network device and the terminal device may be performed on a licensed spectrum, may be performed on an unlicensed spectrum, or may be performed on both a licensed spectrum and an unlicensed spectrum. The communication between the network device and the terminal device may be performed on a spectrum below 6 gigahertz (GHz), may be performed on a spectrum above 6 GHz, or may be performed on both a spectrum below 6 GHz and a spectrum above 6 GHz. A spectrum resource used between the network device and the terminal device is not limited in embodiments of this disclosure.

The terminal device in embodiments of this disclosure may also be referred to as a terminal, and may be a device having a wireless transceiver function. The terminal device may be user equipment (UE). The UE may be a handheld device, a vehicle-mounted device, a wearable device, or a computing device capable of wireless communication. For example, the UE may be a mobile phone, a tablet computer, or a computer having a wireless transceiver function. Alternatively, the terminal device may be a virtual reality terminal device, an augmented reality terminal device, a wireless terminal in industrial control, a wireless terminal in self driving, a wireless terminal in telemedicine, a wireless terminal in a smart grid, a wireless terminal in a smart city, a wireless terminal in a smart home, and/or the like.

In embodiments of this disclosure, an apparatus configured to implement functions of the terminal device may be a terminal device, or may be an apparatus, for example, a chip system, that can support the terminal device in implementing the function. The apparatus may be deployed on the terminal device, or may be used together with the terminal device. In embodiments of this disclosure, the chip system may include a chip, or may include a chip and another discrete component. In the technical solutions provided in embodiments of this disclosure, the technical solutions provided in embodiments of this disclosure are described using an example in which the apparatus configured to implement functions of the terminal device is a terminal device.

The network device in embodiments of this disclosure includes a base station (BS), and may be a device deployed in a radio access network for wireless communication with the terminal device. The base station may be in a plurality of forms, for example, a macro base station, a micro base station, a relay station, and an access point. The base station in embodiments of this disclosure may be a base station in a 5G system or a base station in an LTE system. The base station in the 5G system may also be referred to as a transmission reception point (TRP) or a next generation NodeB (gNB, or gNodeB). In embodiments of this disclosure, an apparatus configured to implement functions of the network device may be a network device, or may be an apparatus, for example, a chip system, that can support the network device in implementing the function. The apparatus may be deployed on the network device, or may be used together with the network device. In the technical solutions provided in embodiments of this disclosure, the technical solutions provided in embodiments of this disclosure are described using an example in which the apparatus configured to implement functions of the network device is a network device.

In the communication system, the terminal device may access the network device and communicate with the network device. For example, one network device may manage one or more (for example, three or six) cells, and the terminal device may access the network device in at least one of the one or more cells, and communicate with the network device in a cell in which the terminal device is located. In embodiments of this disclosure, "at least one" may be one, two, three, or more. This is not limited in embodiments of this disclosure.

In some possible communication scenarios, a data packet transmitted between the terminal device and the network device has a small data amount. For example, for many typical applications in smart factories, uplink data packets are mostly information fed back for performing of actions, simple location update messages, or information collected from the outside. These data packets have only several bytes to dozens of bytes. These data packets are bursty most of the time, and the data packets may be transmitted in one transport block (TB) or one slot due to the small data amount of the data packets.

In a possible implementation, when the terminal device needs to transmit data specific to the terminal device to the network device, the terminal device needs to be in a radio resource control connected (RRC_CONNECTED) mode. In embodiments of this disclosure, when the terminal device is in the RRC_CONNECTED mode, there is an RRC connection between the terminal device and the network device. In this case, the network device knows that the terminal device is within a coverage area or a management area of the network device. For example, the network device knows that the terminal device is within a coverage area of a cell managed by the network device; a core network knows a coverage area or a management area of a specific network device within which the terminal device is located; and the core network knows a specific network device through which the terminal device can be positioned or found.

For the foregoing transmission scenario for burst small packets, when no data is transmitted between the terminal device and the network device, the terminal device may be switched to an RRC inactive (RRC_INACTIVE) mode for power saving. In embodiments of this disclosure, when the terminal device is in the RRC_INACTIVE mode, there is no RRC connection between the terminal device and the network device. In this case, the network device does not know whether the terminal device is within a coverage area or a management area of the network device. For example, the network device does not know whether the terminal device is within a coverage area of a cell managed by the network device; a core network does not knows a coverage area or a management area of a specific network device within which the terminal device is located; and the core network does not knows a specific network device through which the terminal device can be positioned or found. When the terminal device is in the RRC_INACTIVE mode, the terminal device may receive a paging message, a synchronization signal, a broadcast message, system information, and/or the like from the network device.

In a possible implementation, when the terminal device is in the RRC_INACTIVE mode, if the terminal device needs to transmit data specific to the terminal device to the network device, the terminal device is allowed to transmit, in the RRC_INACTIVE mode, the data specific to the terminal device to the network device to avoid power consumption and signaling overheads arising from switching to the RRC_CONNECTED mode for data transmission performed by the terminal device. It should be understood that a method provided in embodiments of this disclosure is not limited to being used in the transmission scenario for small packets described above, and may be further used in a transmission scenario for data packets of other sizes or other data packet transmission scenarios.

An implementation in which the terminal device in the RRC_INACTIVE mode performs uplink data transmission with the network device may be as follows: The terminal device performs uplink data transmission with the network device using a random access process.

Figure 2:
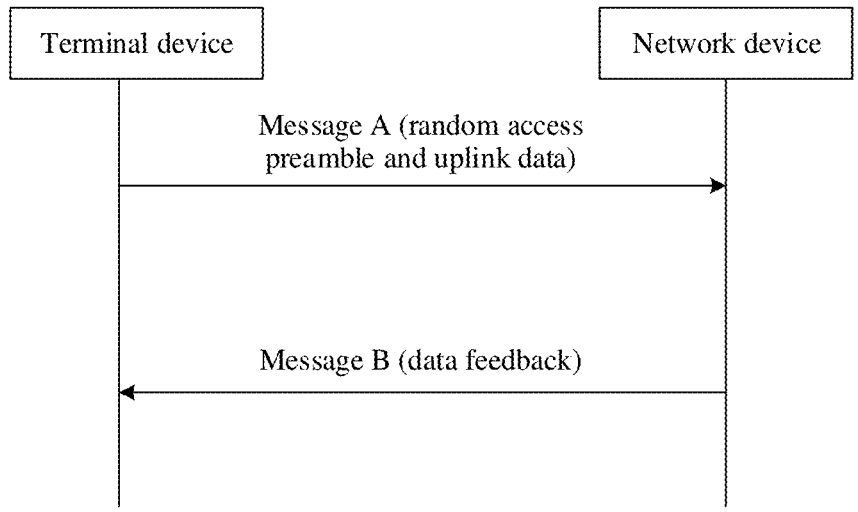
FIG. 2 is a schematic flowchart of 2-step random access according to an embodiment of this disclosure.

For example, FIG. 2 is an example flowchart of a random access method. In the method shown in FIG. 2, a terminal device sends a message A to a network device, where the message A includes a random access preamble and uplink data. In embodiments of this disclosure, the random access preamble may also be referred to as an access preamble, an access preamble sequence, a random access preamble sequence, or a preamble. This is not limited in embodiments of this disclosure. Specifically, the terminal device sends the random access preamble to the network device on a physical random access channel occasion (PRACH occasion), where the random access preamble is for uplink synchronization with the network device. The terminal device sends the uplink data to the network device through a physical uplink shared channel (PUSCH). After receiving the message A, the network device sends a message B to the terminal device. Optionally, the message A may include an RRC setup request (RRCSetupRequest) message or an RRC resume request (RRCResumeRequest) message. Optionally, the message B may include one or more of the following information: an RRC setup (RRCSetup) message, an RRC resume (RRCResume) message, feedback information of the uplink data in the message A, a power control command, and the like. In embodiments of this disclosure, the method shown in FIG. 2 may be referred to as "2-step random access", "Type-2 random access", a "2-step access method", or a "2-step RACH". The network device configures, for the terminal device, a time-frequency resource for random access. How to improve a resource utilization of the time-frequency resource is an urgent technical problem to be resolved.

In view of this, embodiments of this disclosure provide an uplink data transmission method. A terminal device determines, based on indication information of a network device, a time-frequency resource corresponding to a random access resource, or a part of a time-frequency resource in the random access resource, where the time-frequency resource is not used in a random access process. The terminal device may directly transmit uplink data on the time-frequency resource. Configuration information of a time-frequency resource for random access may be reused for configuration information of the time-frequency resource, so that signaling overheads are reduced and a resource utilization is improved.

Some embodiments are used below to describe in detail the technical solutions in embodiments of this disclosure. In embodiments of this disclosure, when the terminal device sends the uplink data to the network device, the terminal device may be in an RRC_INACTIVE mode. However, it is not excluded that these embodiments may be applied when the terminal device is in another RRC mode, for example, when the terminal device is in an RRC_CONNECTED mode or an RRC idle mode. In embodiments of this disclosure, when the terminal device is in the RRC idle mode, there is no RRC connection between the terminal device and the network device. In this case, the network device does not know whether the terminal device is within a coverage area of the network device or a management area of the network device. For example, the network device does not know whether the terminal device is within a coverage area of a cell managed by the network device; a core network does not know a coverage area or a management area of a specific network device within which the terminal device is located; and the core network does not know a specific network device through which the terminal device can be positioned or found. When the terminal device is in the RRC idle mode, the terminal device may receive a paging message, a synchronization signal, a broadcast message, system information, and/or the like from the network device.

Figure 3:
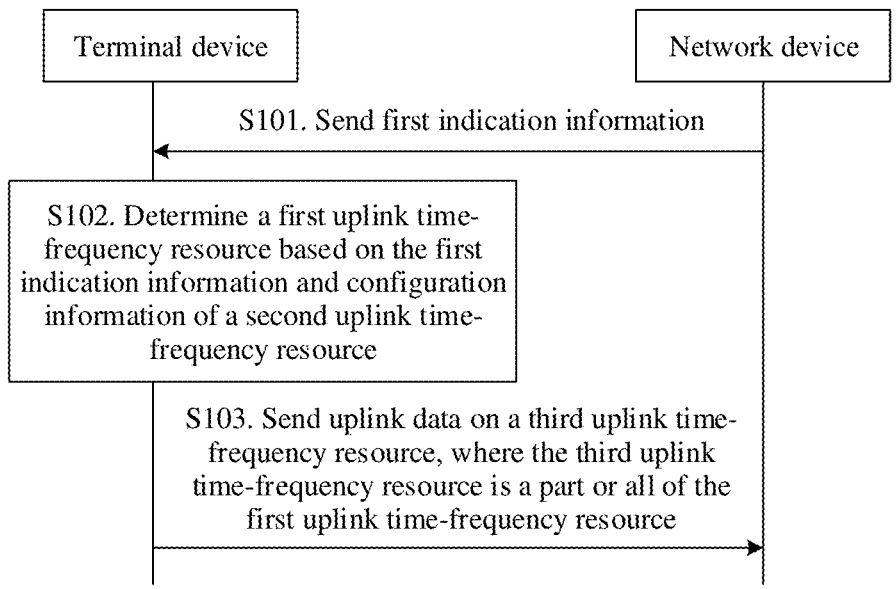
FIG. 3 is a schematic flowchart of uplink data transmission according to an embodiment of this disclosure.

FIG. 3 is a schematic flowchart of an uplink data transmission method according to an embodiment of this disclosure. This embodiment relates to a specific process of uplink data transmission between a network device and a terminal device. As shown in FIG. 3, the method may include S101, S102, and S103.

S101. The network device sends first indication information to the terminal device. Correspondingly, the terminal device receives the first indication information from the network device. Optionally, the first indication information is carried in an RRC message, downlink control information (DCI), a media access control (MAC) message, a system message, or a broadcast message. The RRC message may be an RRC message specific to the terminal device or an RRC message specific to a cell.

The first indication information includes an offset value, and the offset value is a time-domain offset value or a frequency-domain offset value of a first uplink time-frequency resource relative to a second uplink time-frequency resource. The first uplink time-frequency resource is a time-frequency resource of an uplink data channel, and the second uplink time-frequency resource is for random access. In this embodiment of this disclosure, there are two types of random access: 2-step random access and 4-step random access. In this embodiment of this disclosure, that the second uplink time-frequency resource is for 2-step random access is used for description.

S102. The terminal device determines the first uplink time-frequency resource based on the first indication information and configuration information of the second uplink time-frequency resource.

The second uplink time-frequency resource may be a physical random access channel occasion (PRACH occasion, RO) in a physical random access channel (PRACH) slot, and the RO is for carrying a random access preamble. In a random access process, the terminal device sends a preamble to the network device on the RO, and the network device estimates a timing advance TA based on the preamble, where the TA is used by the terminal device for uplink synchronization with the network device.

The second uplink time-frequency resource may be a physical uplink shared channel occasion (PUSCH occasion, PO) associated with the physical random access channel PRACH slot, and the PO is for carrying uplink data. The PO associated with the PRACH slot may also be understood as a PO associated with an RO in the PRACH slot. In a random access process, the terminal device sends the uplink data to the network device on the PO, where the uplink data is specific information or unicast information of the terminal device. For example, the terminal device may send a PUSCH specific to the terminal device to the network device on the PO. For example, the PUSCH specific to the terminal device meets one or more of the following conditions: A transmission parameter of the PUSCH is specific to the terminal device or specific to a terminal device group to which the terminal device belongs; a cyclic redundancy check (CRC) parity bit of the PUSCH is scrambled using an identifier of the terminal device; and information carried on the PUSCH is specific to the terminal device or specific to a terminal device group to which the terminal device belongs. In this embodiment of this disclosure, the identifier of the terminal device may be a cell radio network temporary identifier (, C-RNTI) of the terminal device or another type of radio network temporary identifier (RNTI) of the terminal device. This is not limited in this embodiment of this disclosure.

The first indication information includes an offset value, and that the terminal device determines the first uplink time-frequency resource based on the first indication information and configuration information of the second uplink time-frequency resource specifically includes: The terminal device determines the first uplink time-frequency resource based on the offset value and the configuration information of the second uplink time-frequency resource. That the terminal device determines the first uplink time-frequency resource based on the offset value and the configuration information of the second uplink time-frequency resource includes Case 1 and Case 2.

Case 1: The second uplink time-frequency resource is a PO, and the terminal device determines the first uplink time-frequency resource based on the offset value and the configuration information of the second uplink time-frequency resource. Specifically, Operation 1 and Operation 2 are included.

Operation 1: The terminal device determines the second uplink time-frequency resource based on the configuration information of the second uplink time-frequency resource.

The second uplink time-frequency resource is the PO. In this case, the configuration information of the second uplink time-frequency resource is configuration information of the PO. Optionally, the second uplink time-frequency resource is a group of POs associated with a PRACH slot, or the second uplink time-frequency resource is a plurality of groups of POs associated with a plurality of consecutive PRACH slots.

In this embodiment of this disclosure, a PRACH slot may be one subframe or two subframes. A PRACH slot may be determined based on a subcarrier spacing of a preamble carried in the PRACH slot. Specifically, when a subcarrier spacing of a preamble carried in a PRACH slot is $\mu_1$, the PRACH slot is a slot corresponding to a case in which the subcarrier spacing is $\mu_1$. For example, if a subcarrier spacing of a preamble carried in a PRACH slot is 30 kHz, and a subcarrier spacing of a bandwidth part (BWP) in which the PRACH slot is located is 60 kHz, a time length of the PRACH slot is 0.5 millisecond, and a slot length of the BWP in which the PRACH slot is located is 0.25 millisecond. In this case, the time length of the PRACH slot is equal to a time length of two slots of the BWP in which the PRACH slot is located. In other words, the PRACH slot corresponds to two consecutive slots of the BWP in which the PRACH slot is located. In this embodiment of this disclosure, a start slot of a PRACH slot may be understood as a start slot that corresponds to the PRACH slot and that is of α consecutive slots of a BWP in which the PRACH slot is located, where α is a positive integer. For example, a PRACH slot corresponds to a slot 0 and a slot 1 of a BWP in which the PRACH slot is located, and the slot 0 is earlier than the slot 1. In this case, a start slot of the PRACH slot is the slot 0.

The configuration information of the second uplink time-frequency resource includes any one or more of the following configurations.

Figure 4:
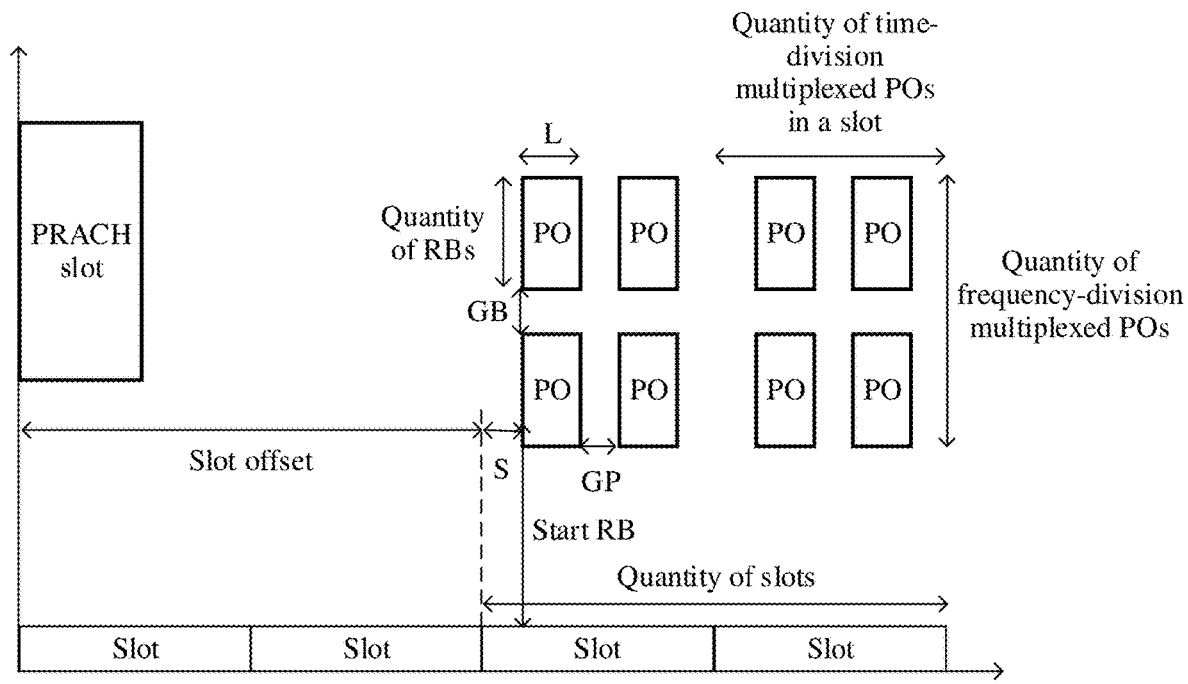
FIG. 4 is a schematic diagram of a 2-step random access resource according to an embodiment of this disclosure.

1. Quantity of consecutive slots in which one or more groups of POs associated with one or more PRACH slots are located For example, as shown in FIG. 4, a PRACH slot is associated with a group of POs. The terminal device may determine, based on the parameter nrofSlotsMsgAPUSCH in an RRC message, the quantity of consecutive slots in which the group of POs are located. In FIG. 4, the quantity of the consecutive slots in which the group of POs are located is 2.

2. Quantity of time-division multiplexed POs in each of consecutive slots in which one or more groups of POs associated with one or more PRACH slots are located For example, the terminal device may determine, based on the parameter nrofMsgAPOperSlot in an RRC message, the quantity of the time-division multiplexed POs in each of the slots in which the group of POs are located. In FIG. 4, the quantity of the time-division multiplexed POs is 2.

3. Quantity of frequency-division multiplexed POs in one or more groups of POs associated with one or more PRACH slots For example, the terminal device may determine, based on the parameter nrMsgAPO-FDM in an RRC message, the quantity of the frequency-division multiplexed POs. In FIG. 4, the quantity of the frequency-division multiplexed POs is 2.

4. Time-domain interval between a start slot of consecutive slots in which one or more groups of POs associated with one or more PRACH slots are located and a start slot of the one or more PRACH slots For example, the terminal device may determine, based on the parameter msgAPUSCH-timeDomainOffset in an RRC message, the time-domain interval between the start slot of the consecutive slots in which the group of POs are located and the start slot of the PRACH slots. In FIG. 4, the time-domain interval is two slots.

5. Guard interval in time domain between POs adjacent in time domain that are in each of consecutive slots in which one or more groups of POs associated with one or more PRACH slots are located For example, the terminal device may determine, based on the parameter guardPeriodMsgAPUSCH in an RRC message, the guard interval in time-domain between two POs adjacent in time domain that are in each of the slots in which the group of POs are located.

6. Guard bandwidth between POs adjacent in frequency domain that are in one or more groups of POs associated with one or more PRACH slots The terminal device may determine, based on the parameter guardBandMsgAPUSCH in an RRC message, guard bandwidth between two POs that are adjacent in frequency domain.

7. Start symbol location and time-domain length of a first PO in each of consecutive slots in which one or more groups of POs associated with one or more PRACH slots are located, where all POs in all the slots have a same time-domain length For example, on a non-initial BWP, the terminal device may determine, based on the parameter startSymbolAndLengthMsgAPO in an RRC message, the start symbol location and the time-domain length of the first PO in each of the slots in which the group of POs are located. On an initial BWP or on a non-initial BWP for which the parameter startSymbolAndLengthMsgAP is not configured, the terminal device may determine the start symbol location and the time-domain length based on the parameter msgA-timeDomainAllocation in an RRC message.

8. Start RB of a first PO in frequency domain that is in one or more groups of POs associated with one or more PRACH slots For example, the terminal device may determine the start RB of the first PO in frequency domain based on the parameter frequencyStartMsgAPUSCH in an RRC message.

9. Quantity of RBs occupied in frequency domain by each PO in one or more groups of POs associated with one or more PRACH slots For example, the terminal device may determine, based on the parameter nrofPRBsperMsgAPO in an RRC message, the quantity of the RBs occupied by each PO in frequency domain.

10. Resource mapping types of one or more groups of POs associated with one or more PRACH slots
11. Modulation and coding schemes (MCS) for one or more groups of POs associated with one or more PRACH slots
12. Transport block size (TBS) of one or more groups of POs associated with one or more PRACH slots
13. Power control configuration information of one or more groups of POs associated with one or more PRACH slots
14. Configuration parameters of demodulation reference signals (DMRSs) that are associated with one or more groups of POs associated with one or more PRACH slots, where the configuration parameter of the DMRS includes one or more of the following information: a DMRS type, a DMRS time-domain length, a DMRS additional location, DMRS port configuration information, and DMRS sequence configuration information Operation 2: The terminal device determines the first uplink time-frequency resource based on the offset value and the second uplink time-frequency resource.

In an optional manner, the offset value is the time-domain offset value of the first uplink time-frequency resource relative to the second uplink time-frequency resource. An offset direction of the time-domain offset value may be a direction in which a slot number increases, that is, the first uplink time-frequency resource is later than the second uplink time-frequency resource in time domain, or may be a direction in which a slot number decreases, that is, the first uplink time-frequency resource is earlier than the second uplink time-frequency resource in time domain. In the following embodiments, descriptions are provided using an example in which the offset direction of the time-domain offset value is the direction in which the slot number increases.

Specifically, the time-domain offset value may be a time-domain offset value of a start slot of the first uplink time-frequency resource relative to a start slot of the second uplink time-frequency resource; or the time-domain offset value may be a time-domain offset value of a start slot of the first uplink time-frequency resource relative to a last slot of the second uplink time-frequency resource.

Figure 5:
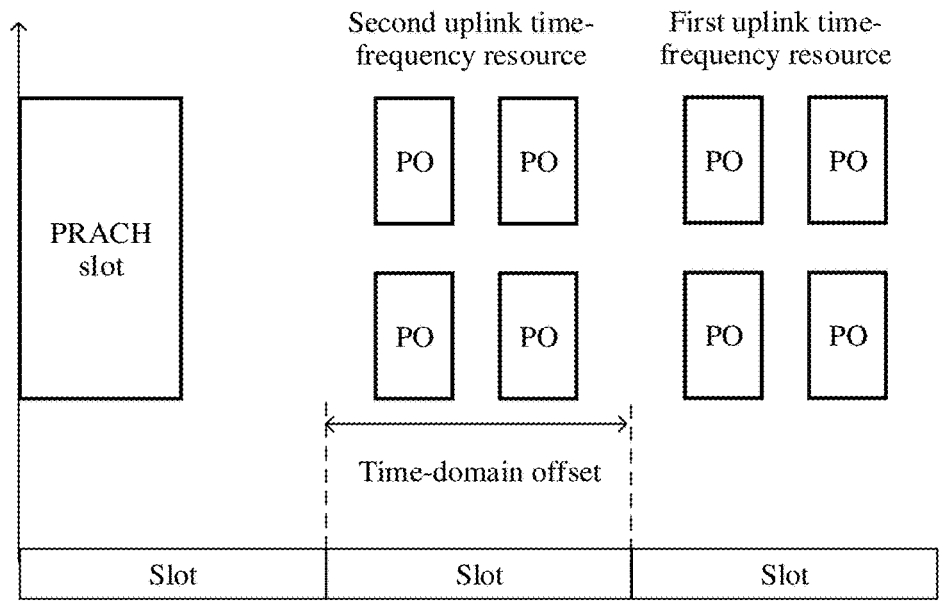
FIG. 5 to FIG. 8 each are a schematic diagram of a 2-step random access resource according to an embodiment of this disclosure.

For example, as shown in FIG. 5, the second uplink time-frequency resource is a group of POs associated with a PRACH slot. The first indication information includes the time-domain offset value. The time-domain offset value is one slot, indicating that a time-domain offset of the start slot of the first uplink time-frequency resource relative to the start slot of the second uplink time-frequency resource is one slot. The terminal device determines the first uplink time-frequency resource based on the time-domain offset value and the second uplink time-frequency resource, that is, the terminal device relocates the second uplink time-frequency resource by one slot in the direction in which the slot number increases, to obtain the first uplink time-frequency resource.

For example, the second uplink time-frequency resource is a group of POs associated with a PRACH slot. The first indication information includes the time-domain offset value. The time-domain offset value is one slot, indicating that a time-domain offset of the start slot of the first uplink time-frequency resource relative to the last slot of the second uplink time-frequency resource is one slot. A quantity of consecutive slots in which the second uplink time-frequency resource is located is 2. The terminal device determines the first uplink time-frequency resource based on the time-domain offset value and the second uplink time-frequency resource, that is, the terminal device relocates the second uplink time-frequency resource by three slots in the direction in which the slot number increases, to obtain the first uplink time-frequency resource.

In another optional manner, the offset value is the frequency-domain offset value of the first uplink time-frequency resource relative to the second uplink time-frequency resource. An offset direction of the frequency-domain offset value may be a direction in which an RB sequence number increases, or may be a direction in which an RB sequence number decreases. In the following embodiments, descriptions are provided using an example in which the offset direction of the frequency-domain offset value is the direction in which the RB sequence number increases.

Specifically, the frequency-domain offset may be a frequency-domain offset value of a start RB of the first uplink time-frequency resource relative to a start RB of the second uplink time-frequency resource, a frequency-domain offset value of a start RB of the first uplink time-frequency resource relative to a last RB of the second uplink time-frequency resource, or a frequency-domain offset value of a start RB of the first uplink time-frequency resource relative to a start RB of a BWP in which the first uplink time-frequency resource is located.

For example, the second uplink time-frequency resource is a group of POs associated with a PRACH slot. The first indication information includes the frequency-domain offset value. The frequency-domain offset value is 32 RBs. In other words, a frequency-domain offset of the start RB of the first uplink time-frequency resource relative to the start RB of the second uplink time-frequency resource is 32 RBs. The terminal device determines the first uplink time-frequency resource based on the start RB and the second uplink time-frequency resource, that is, the second uplink time-frequency resource is relocated by 32 RBs in the direction in which the RB sequence number increases, to obtain the first uplink time-frequency resource.

By implementing the method described in Case 1, corresponding parameters in the configuration information of the second uplink time-frequency resource may be reused for all parameters of the first uplink time-frequency resource, where all the parameters include a time-domain start location, a time-domain length, a frequency-domain start location, a quantity of RBs included in frequency domain, and the like. The network device only needs to indicate, to the terminal device using the first indication information, the time-domain offset value or the frequency-domain offset value of the first uplink time-frequency resource relative to the second uplink time-frequency resource. Correspondingly, the terminal device determines a time-frequency-domain location of the second uplink time-frequency resource based on the configuration information of the second uplink time-frequency resource, and then determines the time-frequency-domain location of the first uplink time-frequency resource based on the time-domain offset value or the frequency-domain offset value that is carried in the first indication information. Similarly, corresponding parameters in the configuration information of the second uplink time-frequency resource may be reused for all parameters such as an MCS, a TBS, and a mapping type of the first uplink time-frequency resource. By implementing the method described in Case 1, the terminal device may reuse the configuration information of the second uplink time-frequency resource for determining the first uplink time-frequency resource, so that signaling overheads of resource configuration information can be reduced, and a resource utilization can be improved.

Case 2: The second uplink time-frequency resource is an RO, and the terminal device determines the first uplink time-frequency resource based on the offset value, the configuration information of the second uplink time-frequency resource, and configuration information of a PO. Specifically, Operation 3, Operation 4, and Operation 5 are included.

Operation 3: The terminal device determines the second uplink time-frequency resource based on the configuration information of the second uplink time-frequency resource.

In Operation 3, the configuration information of the second uplink time-frequency resource may be understood as configuration information of the RO. Optionally, the second uplink time-frequency resource is an RO in a PRACH slot, or may be ROs in a plurality of consecutive PRACH slots.

The configuration information of the second uplink time-frequency resource includes any one or more of the following configurations.

1. Time-domain start location of an RO in one or more PRACH slots, a time-domain length of each RO, and a quantity of time-division multiplexed ROs Specifically, the terminal device may determine, based on a parameter prach-ConfigurationIndex in an RRC message, the time-domain start location of the RO, the time-domain length of the RO, and the quantity of time-division multiplexed ROs. For details, refer to Table 6.3.3.2-2, 6.3.3.2-3, and 6.3.3.2-4 in 3rd generation partnership project (3GPP) technical specification (TS) 38.211 Release 16.0.0.

2. Frequency-domain start location of an RO in one or more PRACH slots

Specifically, the terminal device may determine the frequency-domain start location of the RO based on a parameter msg1-FrequencyStart or a parameter msgA-RO-FrequencyStart in an RRC message.

3. Quantity of frequency-division multiplexed ROs in one or more PRACH slots

Specifically, the terminal device may determine, based on a parameter msg1-FDM or a parameter msgA-RO-FDM in an RRC message, the quantity of frequency-division multiplexed ROs.

4. Quantity of RBs included in each RO in frequency domain in one or more PRACH slots The terminal device may determine, based on a parameter $N_{RB}^{RA}$ in Table 6.3.3.2-1 in 3GPP TS 38.211 Release 16.0.0, the quantity of RBs included by each RO in frequency domain.

Operation 4: The terminal device determines the PO based on the configuration information of the PO.

For the configuration information of the PO, refer to the descriptions of the configuration information of the second uplink time-frequency resource in Operation 1. For a method for determining the PO based on the configuration information of the PO, refer to the method for determining the second uplink time-frequency resource based on the configuration information of the second uplink time-frequency resource in Operation 1.

Operation 5: The terminal device determines the first uplink time-frequency resource based on the offset value, the second uplink time-frequency resource, and the PO.

In an optional manner, the offset value is the time-domain offset value of the first uplink time-frequency resource relative to the second uplink time-frequency resource. For descriptions of the time-domain offset value, refer to Operation 2.

Figure 6:
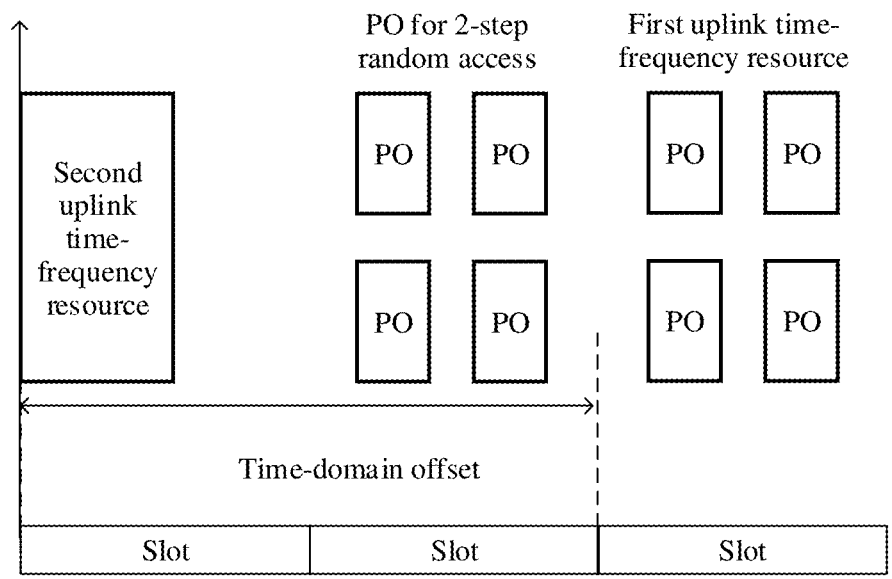

For example, as shown in FIG. 6, the second uplink time-frequency resource is an RO in a PRACH slot. The first indication information includes the time-domain offset value. The time-domain offset value is two slots, indicating that a time-domain offset of a start slot of the first uplink time-frequency resource relative to a start slot of the second uplink time-frequency resource is two slots. That the terminal device determines the first uplink time-frequency resource based on the time-domain offset value, the second uplink time-frequency resource, and the PO specifically includes: The terminal device determines the start slot of the first uplink time-frequency resource based on the time-domain offset value and the second uplink time-frequency resource. For example, when the start slot of the second uplink time-frequency resource is a slot 0, and the start slot of the first uplink time-frequency resource is a slot 2, the PO is relocated in time domain, so that a start slot of the PO is located at the start slot, namely, the slot 2, of the first uplink time-frequency resource. A resource obtained through the relocation in time domain is the first uplink time-frequency resource.

In another optional manner, the offset value is the frequency-domain offset value of the first uplink time-frequency resource relative to the second uplink time-frequency resource. For descriptions of the frequency-domain offset value, refer to Operation 2.

For example, the second uplink time-frequency resource is an RO in a PRACH slot. The first indication information includes the frequency-domain offset value. The frequency-domain offset value is 32 RBs. In other words, a frequency-domain offset of a start RB of the first uplink time-frequency resource relative to a start RB of the second uplink time-frequency resource is 32 RBs. That the terminal device determines the first uplink time-frequency resource based on the frequency-domain offset value, the second uplink time-frequency resource, and the PO specifically includes: The terminal device determines the start RB of the first uplink time-frequency resource based on the frequency-domain offset value and the second uplink time-frequency resource. For example, when the start RB of the second uplink time-frequency resource is an RB 10, and the start RB of the first uplink time-frequency resource is an RB 42, the PO is relocated in frequency domain, so that a start RB of the PO is located at the start RB, namely, the RB 42, of the first uplink time-frequency resource. A resource obtained through the relocation in frequency domain is the first uplink time-frequency resource.

By implementing the method described in Case 2, corresponding parameters in the configuration information of the PO may be reused for all parameters of the first uplink time-frequency resource, where all the parameters include a time-domain start location, a time-domain length, a frequency-domain start location, a quantity of RBs included in frequency domain, and the like. The network device only needs to indicate, to the terminal device using the first indication information, the time-domain offset value or the frequency-domain offset value of the first uplink time-frequency resource relative to the second uplink time-frequency resource (RO). Correspondingly, the terminal device determines a time-frequency-domain location of the second uplink time-frequency resource based on the configuration information of the second uplink time-frequency resource, and then determines the time-domain start location or the frequency-domain start location of the first uplink time-frequency resource based on the time-domain offset value or the frequency-domain offset value that is carried in the first indication information. Similarly, corresponding parameters in the configuration information of the PO may be reused for all parameters such as an MCS, a TBS, and a mapping type of the first uplink time-frequency resource. By implementing the method described in Case 2, the terminal device may reuse the configuration information of the PO for determining the first uplink time-frequency resource, so that signaling overheads of resource configuration information can be reduced, and a resource utilization can be improved.

Optionally, in Case 1 and Case 2, the first indication information may further include configuration information of the first uplink time-frequency resource, as well as the offset value. The configuration information may be any one or more items in a first information set. The first information set includes:

1. quantity of consecutive slots in which the first uplink time-frequency resource is located;
2. quantity of time-division multiplexed PUSCH resources in each of consecutive slots in which the first uplink time-frequency resource is located;
3. quantity of frequency-division multiplexed PUSCH resources in the first uplink time-frequency resource;
4. time-domain interval between a start slot of consecutive slots in which the first uplink time-frequency resource is located and a start slot of PRACH slots associated with the first uplink time-frequency resource;
5. guard interval in time domain between PUSCH resources adjacent in time domain that are in each of consecutive slots in which the first uplink time-frequency resource is located;
6. guard bandwidth between PUSCH resources that are adjacent in frequency domain and that are in the first uplink time-frequency resource;
7. start symbol location and time-domain length of a first PUSCH resource in each of consecutive slots in which the first uplink time-frequency resource is located, where all PUSCH resources in all the slots have a same time-domain length;
8. start RB of a first PUSCH resource in frequency domain in the first uplink time-frequency resource;
9. quantity of RBs occupied by each PUSCH resource in frequency domain in the first uplink time-frequency resource;
10. mapping type of the first uplink time-frequency resource;
11. MCS of the first uplink time-frequency resource;
12. TBS of the first uplink time-frequency resource;
13. power control configuration information of the first uplink time-frequency resource; or
14. configuration information of a DMRS associated with the first uplink time-frequency resource, including one or more of a DMRS type, a DMRS time-domain length, a DMRS additional location, DMRS port configuration information, and DMRS sequence configuration information.

When the first indication information includes the configuration information of the first uplink time-frequency resource, as well as the offset value, that the terminal device determines the first uplink time-frequency resource based on the first indication information and configuration information of the second uplink time-frequency resource specifically includes: The terminal device determines the first uplink time-frequency resource based on the offset value, the configuration information of the first uplink time-frequency resource, and the configuration information of the second uplink time-frequency resource.

When the second uplink time-frequency resource is a PO (that is, Case 1), the terminal device determines the first uplink time-frequency resource based on the offset value, the configuration information of the first uplink time-frequency resource, and configuration information other than the configuration information of the first uplink time-frequency resource in the configuration information of the second uplink time-frequency resource.

Figure 7:
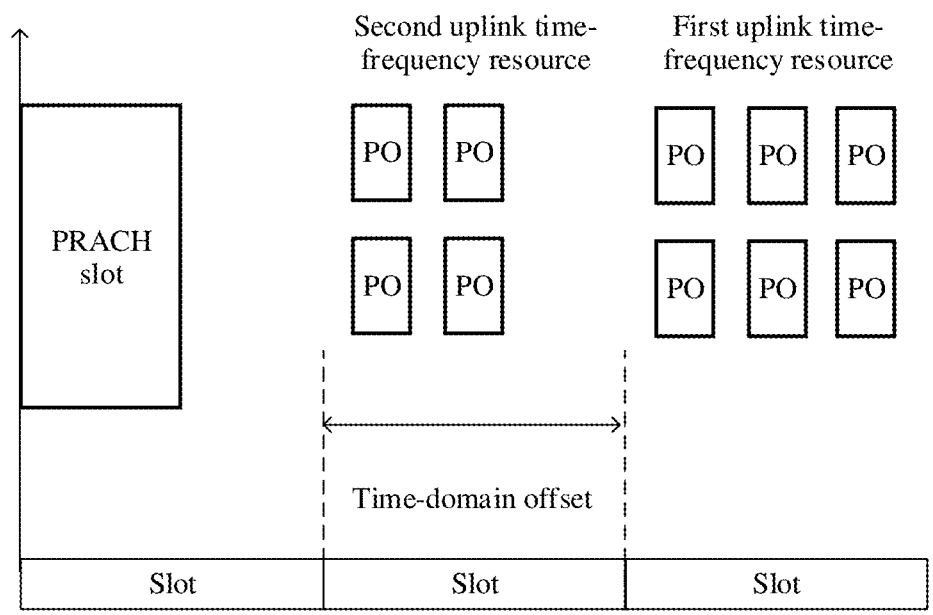

For example, the first indication information further includes the configuration information of the first uplink time-frequency resource, as well as the offset value. The configuration information of the first uplink time-frequency resource is a quantity (corresponding to the second item in the first information set) of time-division multiplexed PUSCH resources in each of consecutive slots in which the first uplink time-frequency resource is located. The terminal device determines the first uplink time-frequency resource based on the time-domain offset value and the quantity of time-division multiplexed POs that are in the first indication information and configuration information other than the quantity of time-division multiplexed POs in the configuration information of the second uplink time-frequency resource. As shown in FIG. 7, the second uplink time-frequency resource is a group of POs associated with a PRACH slot. The terminal device determines the group of POs based on configuration information of the group of POs. A quantity of time-division multiplexed POs in the group of POs is 2, that is, the group of POs are divided into two columns in time domain. The first indication information includes the time-domain offset value, and the time-domain offset value is one slot. In other words, a time-domain offset of a start slot of the first uplink time-frequency resource relative to a start slot of the second uplink time-frequency resource is one slot. The terminal device determines the start slot of the first uplink time-frequency resource based on the offset value and the second uplink time-frequency resource. The terminal device relocates the group of POs in time domain, so that a start slot of the group of POs is located at the start slot of the first uplink time-frequency resource. The first indication information further indicates that a quantity of time-division multiplexed PUSCH resources is 3. The terminal device adds one column of POs to the group of POs obtained through the relocation in time domain, to obtain three columns of POs with a same time-domain interval. The three columns of POs are the first uplink time-frequency resources.

When the second uplink time-frequency resource is an RO (that is, Case 2), the terminal device determines the first uplink time-frequency resource based on the offset value, the configuration information of the first uplink time-frequency resource, and configuration information other than the configuration information of the first uplink time-frequency resource in the configuration information of the PO.

Figure 8:
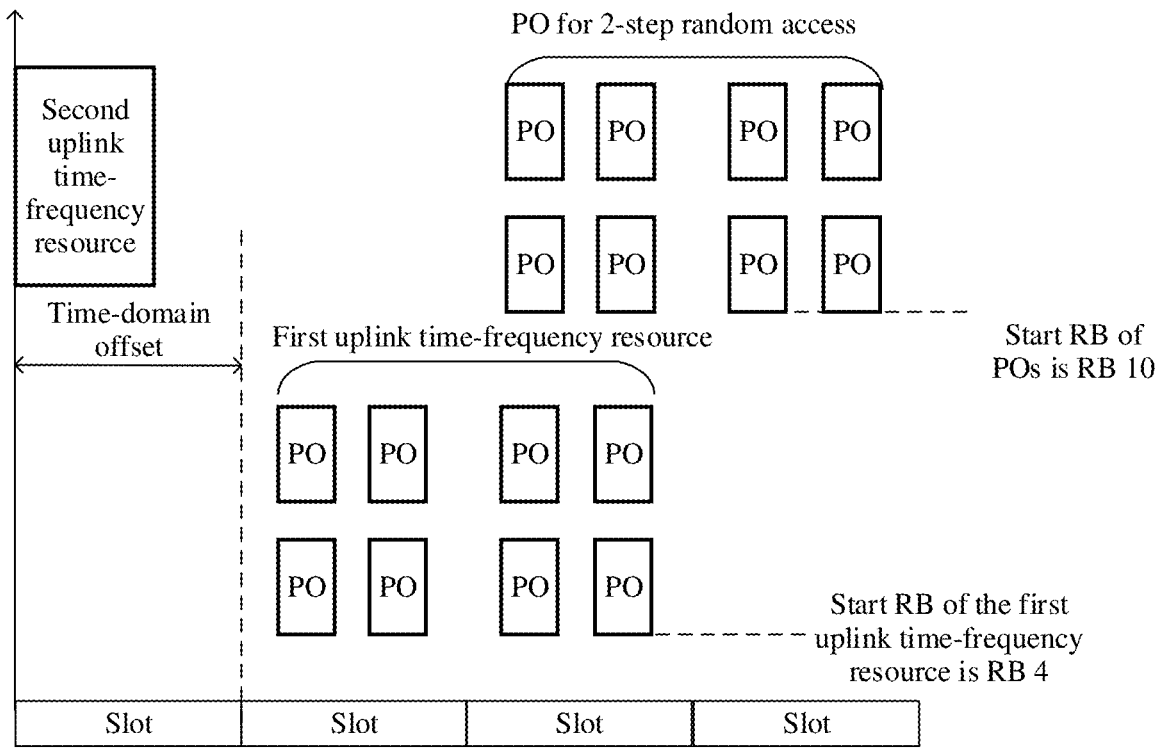

For example, the first indication information further includes the configuration information of the first uplink time-frequency resource, as well as the offset value. The configuration information of the first uplink time-frequency resource is a start RB (corresponding to the eighth item in the first information set) of a first PO in frequency domain in the first uplink time-frequency resource. The terminal device determines the first uplink time-frequency resource based on the time-domain offset value and the start RB that are in the first indication information, the configuration information of the second uplink time-frequency resource, and configuration information other than the start RB in the configuration information of the PO. As shown in FIG. 8, the second uplink time-frequency resource is an RO in a PRACH slot. The terminal device determines the second uplink time-frequency resource based on the configuration information of the second uplink time-frequency resource. The first indication information includes the time-domain offset value, and the time-domain offset value is one slot. In other words, a time-domain offset of a start slot of the first uplink time-frequency resource relative to the second uplink time-frequency resource is one slot. The terminal device determines the start slot of the first uplink time-frequency resource based on the time-domain offset value and the second uplink time-frequency resource. The terminal device determines, based on the configuration information of the PO, a group of POs associated with the PRACH slot. A start RB of the group of POs is an RB 10. The first indication information further includes a start RB of the first uplink time-frequency resource. The start RB is an RB 4. The terminal device relocates the PO in time domain, so that a start slot of the PO is located at the start slot of the first uplink time-frequency resource. The terminal device relocates the PO in frequency domain, so that a start RB of the PO is located at the start RB of the first uplink time-frequency resource. A PO obtained through the relocation is the first uplink time-frequency resource.

By implementing the methods in FIG. 7 and FIG. 8, for determining the first uplink time-frequency resource, the terminal device may reuse configuration information other than the configuration information of the first uplink time-frequency resource in the configuration information of the second uplink time-frequency resource, or may reuse configuration information other than the configuration information of the first uplink time-frequency resource in the configuration information of the PO, so that the signaling overheads of the resource configuration information are reduced, and the resource utilization is improved. In addition, the first indication information may further include the configuration information of the first uplink time-frequency resource, as well as the offset value. This improves resource configuration flexibility.

The terminal device may determine the first uplink time-frequency resource by using the methods in Case 1 and Case 2. This is not limited. Correspondingly, after determining the first indication information and the configuration information of the second uplink time-frequency resource, the network device may determine the first uplink time-frequency resource by using, but not limited to, the methods described in Case 1 and Case 2, and send the first indication information and the configuration information of the second uplink time-frequency resource to the terminal device.

S103. The terminal device sends the uplink data to the network device on a third uplink time-frequency resource. Correspondingly, the network device receives the uplink data from the terminal device on the third uplink time-frequency resource. The third uplink time-frequency resource is a part or all of the first uplink time-frequency resource.

Specifically, the third uplink time-frequency resource is a part or all of a valid uplink time-frequency resource in the first uplink time-frequency resource. The valid uplink time-frequency resource in the first uplink time-frequency resource is a time-frequency resource that meets at least one condition in a first condition set in the first uplink time-frequency resource. The first condition set includes:

1. the time-frequency resource does not overlap with an RO for 4-step random access in terms of time-frequency resources;
2. the time-frequency resource does not overlap with an RO for 2-step random access in terms of time-frequency resources;
3. the time-frequency resource does not overlap with a PO for 2-step random access in terms of time-frequency resources;
4. a DMRS port of the time-frequency resource is different from a DMRS port for 2-step random access;
5. a DMRS sequence associated with the time-frequency resource is different from a DMRS sequence for 2-step random access;
6. the time-frequency resource does not include a downlink symbol;
7. a start location of the time-frequency resource in each slot is not earlier than a resource of a synchronization signal and PBCH block (SSB) in time domain;
8. a distance between a start location of the time-frequency resource and an SSB that is closest to the start location and that is in SSBs earlier than the start location of the time-frequency resource is greater than or equal to N_gap time units, where N_gap is protocol preset, and the time unit may be a symbol, a millisecond, or the like; and
9. a distance between a start location of the time-frequency resource and a downlink symbol that is closest to the start location and that is in downlink symbols earlier than the start location is greater than or equal to N_gap time units, where N_gap is protocol preset, and the time unit may be a symbol, a millisecond, or the like.

The terminal device may determine the valid uplink time-frequency resource in the first uplink time-frequency resource by using the following two methods:

Method 1: After determining the first uplink time-frequency resource, the terminal device determines the valid uplink time-frequency resource in the first uplink time-frequency resource based on the first condition set. In this case, the valid uplink time-frequency resource in the first uplink time-frequency resource is a part or all of the first uplink time-frequency resource.

Method 2: When the second uplink time-frequency resource is a PO, the terminal device determines a valid uplink time-frequency resource in the second uplink time-frequency resource based on the first condition set, and then determines the first uplink time-frequency resource based on the valid uplink time-frequency resource in the second uplink time-frequency resource. For a method for determining the first uplink time-frequency resource, refer to any manner described in Case 1. To be specific, the "second uplink time-frequency resource" in Case 1 is replaced with the "valid uplink time-frequency resource in the second uplink time-frequency resource". In this case, the valid uplink time-frequency resource in the first uplink time-frequency resource is equivalent to the first uplink time-frequency resource.

After determining the valid uplink time-frequency resource in the first uplink time-frequency resource, the terminal device sends the uplink data to the network device on a part or all, namely, the third uplink time-frequency resource, of the valid uplink time-frequency resource in the first uplink time-frequency resource.

The uplink data sent by the terminal device on the third uplink time-frequency resource is uplink data scrambled by the terminal device using a radio network temporary identifier (RNTI). Specifically, the terminal device determines the RNTI based on the third uplink time-frequency resource, and the terminal device scrambles a cyclic redundancy check (CRC) bit of the uplink data by using a scrambling code sequence generated by using the RNTI.

That the terminal device determines the RNTI based on the third uplink time-frequency resource specifically includes: The terminal device determines the RNTI based on at least one of time-domain information, frequency-domain information, and code-domain information of the third uplink time-frequency resource. The time-domain information of the third uplink time-frequency resource includes at least one of a symbol location, a slot number, a subframe number, and a frame number of the third uplink time-frequency resource. The frequency-domain information of the third uplink time-frequency resource includes a carrier index and/or an RB index of the third uplink time-frequency resource. The code-domain information of the third uplink time-frequency resource includes one or more of a DMRS port number and/or a DMRS sequence of the third uplink time-frequency resource.

The terminal device determines the RNTI based on the time-domain information of the third uplink time-frequency resource. For example, that the terminal device determines the RNTI based on the subframe number of the third uplink time-frequency resource specifically includes: The terminal device determines the RNTI based on the subframe number of the third uplink time-frequency resource and a mapping relationship between the subframe number and the RNTI. The mapping relationship between the subframe number and the RNTI is configured by the network device for the terminal device by using higher layer signaling or is protocol preset. Table 1 is merely an example of the mapping relationship. A form of the mapping relationship is not limited in this embodiment. When the subframe number of the third uplink time-frequency resource is 0, the RNTI determined by the terminal device based on the subframe number of the third uplink time-frequency resource is an RNTI 0, and the terminal device scrambles the CRC bit of the uplink data by using a scrambling sequence generated by using the RNTI 0.

TABLE 1

| Mapping relationship between a subframe number of the third uplink time-frequency resource and an RNTI | |
|---|---|
| Subframe number | RNTI |
| 0 | RNTI 0 |
| 1 | RNTI 1 |

The terminal device determines the RNTI based on the code-domain information of the third uplink time-frequency resource. For example, that the terminal device determines the RNTI based on the DMRS port number of the third uplink time-frequency resource specifically includes: The terminal device determines the RNTI based on the DMRS port number of the third uplink time-frequency resource and a mapping relationship between each DMRS port number and the RNTI. The mapping relationship between each DMRS port number and the RNTI is configured by the network device for the terminal device by using higher layer signaling or is protocol preset. Table 2 is merely an example of the mapping relationship. A form of the mapping relationship is not limited in this embodiment. When the DMRS port number of the third uplink time-frequency resource is 0, the RNTI determined by the terminal device based on the DMRS port number of the third uplink time-frequency resource is an RNTI 0, and the terminal device scrambles the CRC bit of the uplink data by using a scrambling sequence generated by using the RNTI 0.

TABLE 2

| Mapping relationship between a DMRS port number of the third uplink time-frequency resource and an RNTI | |
|---|---|
| DMRS port number | RNTI |
| 0 | RNTI 0 |
| 1 | RNTI 1 |

The terminal device determines the RNTI based on the time-domain information and the code-domain information of the third uplink time-frequency resource. For example, that the terminal device determines the RNTI based on the subframe number of the third uplink time-frequency resource and the DMRS port number of the third uplink time-frequency resource specifically includes: The terminal device determines the RNTI based on the subframe number of the third uplink time-frequency resource, the DMRS port number of the third uplink time-frequency resource, a mapping relationship among each subframe number, each DMRS port number, and the RNTI. The mapping relationship is configured by the network device for the terminal device by using higher layer signaling or is protocol preset. Table 3 is merely an example of the mapping relationship. A form of the mapping relationship is not limited in this embodiment. When the subframe number of the third uplink time-frequency resource is 0, and the DMRS port number of the third uplink time-frequency resource is 0, the RNTI determined by the terminal device based on the third uplink time-frequency resource is an RNTI 0, and the terminal device scrambles the CRC bit of the uplink data by using a scrambling sequence generated by using the RNTI 0.

TABLE 3

Mapping relationship among a subframe number of the third uplink time-frequency resource, a DMRS port number of the third uplink time-frequency resource, and an RNTI

| Subframe number | DMRS port number | RNTI |
| --- | --- | --- |
| 0 | 0 | RNTI 0 |
| 0 | 1 | RNTI 1 |
| 1 | 0 | RNTI 2 |
| 1 | 1 | RNTI 3 |

After receiving the uplink data on the third uplink time-frequency resource, the network device determines the RNTI by using, but not limited to, the method for the terminal device to determine the RNTI based on the third uplink time-frequency resource, and descrambles the uplink data by using a scrambling code sequence generated by using the RNTI.

By implementing the foregoing method for determining the RNTI, for receiving the uplink data, the network device may determine, based on the third uplink time-frequency resource carrying the uplink data, the RNTI for scrambling the uplink data, with no need to traverse possible RNTIs to descramble the uplink data. This reduces receiving complexity of the network device.

After receiving the uplink data from the terminal device on the third uplink time-frequency resource, the network device determines a beam for sending feedback information of the uplink data, that is, determines an SSB for sending the feedback information of the uplink data. Optionally, the beam may be further used to receive the uplink data.

The network device determines, based on the third uplink time-frequency resource and an association relationship between the first uplink time-frequency resource and an SSB set, an SSB associated with the third uplink time-frequency resource, where the SSB is for sending the feedback information of the uplink data.

The network device determines, based on the third uplink time-frequency resource and the association relationship between the first uplink time-frequency resource and the SSB set, the SSB associated with the third uplink time-frequency resource. The association relationship between the first uplink time-frequency resource and the SSB set is configured by the network device.

The association relationship between the first uplink time-frequency resource and the SSB set is an association relationship between a PUSCH resource in the first uplink time-frequency resource and the SSB set, and/or an association relationship between a DMRS of the first uplink time-frequency resource and the SSB set. The DMRS may be understood as a DMRS port or a DMRS sequence. The SSB set may be individually configured by the network device for the random access process by using an RRC message. Optionally, the terminal device may notify, by using an RRC message or a MAC message, the network device of an index of an SSB that the terminal device expects to use.

In an optional manner, the association relationship between the first uplink time-frequency resource and the SSB set is an association relationship (referred to as an association relationship 1 below) between the PUSCH resource in the first uplink time-frequency resource and an SSB in the SSB set. Specifically, each PUSCH resource in the first uplink time-frequency resource is associated with $N_{PO-SSB}$ SSBs with consecutive indexes, where $N_{PO-SSB}$ is a positive integer, or $M_{PO-SSB}$ PUSCH resources with consecutive indexes in the first uplink time-frequency resource are associated with one SSB, where $M_{PO-SSB}$ is a positive integer.

For example, the first uplink time-frequency resource includes a PUSCH resource 0, a PUSCH resource 1, a PUSCH resource 2, and a PUSCH resource 3, and $N_{PO-SSB}$ is equal to 1. In other words, one PUSCH resource in the first uplink time-frequency resource is associated with one SSB in the SSB set. An example of the association relationship 1 is shown in Table 4.

After determining the association relationship 1, the network device determines, based on a PUSCH resource in the third uplink time-frequency resource and the association relationship 1, the SSB associated with the third uplink time-frequency resource. For example, when the third uplink time-frequency resource is the PUSCH resource 2, the network device determines, based on an association relationship in Table 4, that the SSB associated with the third uplink time-frequency resource is an SSB 2.

TABLE 4

Association relationship between a PUSCH resource in the first uplink time-frequency resource and an SSB in the SSB set

| PUSCH resource | SSB |
| --- | --- |
| PUSCH resource 0 | SSB 0 |
| PUSCH resource 1 | SSB 1 |
| PUSCH resource 2 | SSB 2 |
| PUSCH resource 3 | SSB 3 |

In another optional manner, the association relationship between the first uplink time-frequency resource and the SSB set is an association relationship (referred to as an association relationship 2 below) between a DMRS of the first uplink time-frequency resource and an SSB in the SSB set. Specifically, there are S1 DMRSs on the first uplink time-frequency resource in total, where S1 is a positive integer. Each of the S1 DMRSs is associated with an SSB, and each SSB is associated with S2 DMRSs or S3 SSBs, where S2 and S3 each are a positive integer. The DMRSs in the first uplink time-frequency resource are sorted in one or more of the following manners: in ascending order of frequency-domain indexes of PUSCH resources, in ascending order of DMRS port numbers of one PUSCH resource, in ascending order of DMRS sequence indexes of one PUSCH resource, in ascending order of time-domain resource indexes of PUSCH resources in slots, or in ascending order of slot indexes.

For example, there are four DMRSs on the first uplink time-frequency resource: a DMRS 0, a DMRS 1, a DMRS 2, and a DMRS resource 3, where S2 is equal to 2. In other words, two DMRSs of the first uplink time-frequency resource are associated with one SSB in the SSB set. An example of the association relationship 2 is shown in Table 5.

After determining the association relationship 2, the network device determines, based on a DMRS of the third uplink time-frequency resource and the association relationship 2, the SSB associated with the third uplink time-frequency resource. For example, when the DMRS of the third uplink time-frequency resource is the DMRS 2, the network device determines, based on an association relationship in Table 5, that the SSB associated with the third uplink time-frequency resource is an SSB 1.

TABLE 5

Association relationship between a DMRS of the first uplink time-frequency resource and an SSB in the SSB set

| DMRS | SSB |
| --- | --- |
| DMRS 0 | SSB 0 |
| DMRS 1 | SSB 0 |
| DMRS 2 | SSB 1 |
| DMRS 3 | SSB 1 |

In still another optional manner, the association relationship between the first uplink time-frequency resource and the SSB set is the association relationship 1 and the association relationship 2. Optionally, each PUSCH resource in the first uplink time-frequency resource is associated with $N_{PO-SSB}$ SSBs, and the first uplink time-frequency resource is associated with $N_{SSB}$ SSBs in total, where $N_{PO-SSB}$ and $N_{SSB}$ each are a positive integer. Each SSB of the $N_{SSB}$ SSBs is associated with $N_{DMRS}$ DMRSs of a PUSCH resource associated with the SSB. In other words, an $n_{PO-SSB}{}^{th}$ SSB associated with each PUSCH resource is associated with $N_{DMRS}$ consecutive DMRSs whose indexes start from $I_{index}$, where $n_{PO-SSB}$ is a nonnegative integer less than $N_{PO-SSB}$, $I_{index}=S_{DMRS} \cdot n_{PO-SSB}/N_{PO-SSB}$, and $S_{DMRS}$ is a quantity of DMRSs of each PUSCH resource. Optionally, $M_{PO-SSB}$ PUSCH resources with consecutive indexes in the first uplink time-frequency resource are associated with one SSB, where $M_{PO-SSB}$ is a positive integer, and the SSB is associated with $N_{DMRS}$ consecutive DMRSs that are associated with the $M_{PO-SSB}$ PUSCH resources and whose indexes start from 0.

For example, the first uplink time-frequency resource includes a PUSCH resource 1 and a PUSCH resource 2, $N_{PO-SSB}$ is equal to 2, and $N_{SSB}$ is equal to 4, that is, each PUSCH resource is associated with two SSBs. An example of the association relationship 1 is shown in Table 6. One PUSCH resource is associated with two SSBs, and $S_{DMRS}$ is equal to 4, that is, there are four DMRSs on each PUSCH resource, and each SSB is associated with two DMRSs. An example of the association relationship 2 is shown in Table 7.

The network device determines, based on the PUSCH resource included in the third uplink time-frequency resource, the association relationship 1, the DMRS of the third uplink time-frequency resource, and the association relationship 2, the SSB associated with the third uplink time-frequency resource. For example, when the third uplink time-frequency resource is a PUSCH resource 0, and the DMRS of the third uplink time-frequency resource is a DMRS 2, based on Table 6 and Table 7, the network device determines that the SSB associated with the third uplink time-frequency resource is an SSB 1.

TABLE 6

Association relationship between a PUSCH resource in the first uplink time-frequency resource and an SSB in the SSB set

| PUSCH resource | SSB |
| --- | --- |
| PUSCH resource 0 | SSB 0 and SSB 1 |
| PUSCH resource 1 | SSB 2 and SSB 3 |

TABLE 7

Association relationship between a DMRS of the first uplink time-frequency resource and an SSB in the SSB set

| SSB | DMRS |
| --- | --- |
| SSB 0 | DMRS 0 and DMRS 1 |
| SSB 1 | DMRS 2 and DMRS 3 |
| SSB 2 | DMRS 0 and DMRS 1 |
| SSB 3 | DMRS 2 and DMRS 3 |

After determining, by using the foregoing method, the SSB associated with the third uplink time-frequency resource, the network device determines, based on the SSB associated with the third uplink time-frequency resource, the beam for sending the feedback information of the uplink data, and sends the feedback information to the terminal device by using the beam. A mapping relationship between the SSB and the beam is configured by the network device or is protocol preset.

The foregoing embodiment provides the uplink data transmission method. The terminal device determines, based on indication information of the network device, a time-frequency resource that is of an uplink data channel and that may not be for the random access process and that corresponds to a random access resource. The time-frequency resource may be used to directly transmit the uplink data. Configuration information of a random access resource may be reused for configuration information of the time-frequency resource, so that the signaling overheads are reduced and the resource utilization is improved. In addition, an association relationship between the time-frequency resource and an SSB is set, so that the network device can determine, based on the association relationship, the beam for sending the feedback information of the uplink data, to improve data transmission reliability. In addition, a mapping relationship between the time-frequency resource and an RNTI is set, so that the network device may determine, based on the time-frequency resource carrying the uplink data, a scrambling code sequence for descrambling the uplink data, to reduce the receiving complexity of the network device.

Figure 9:
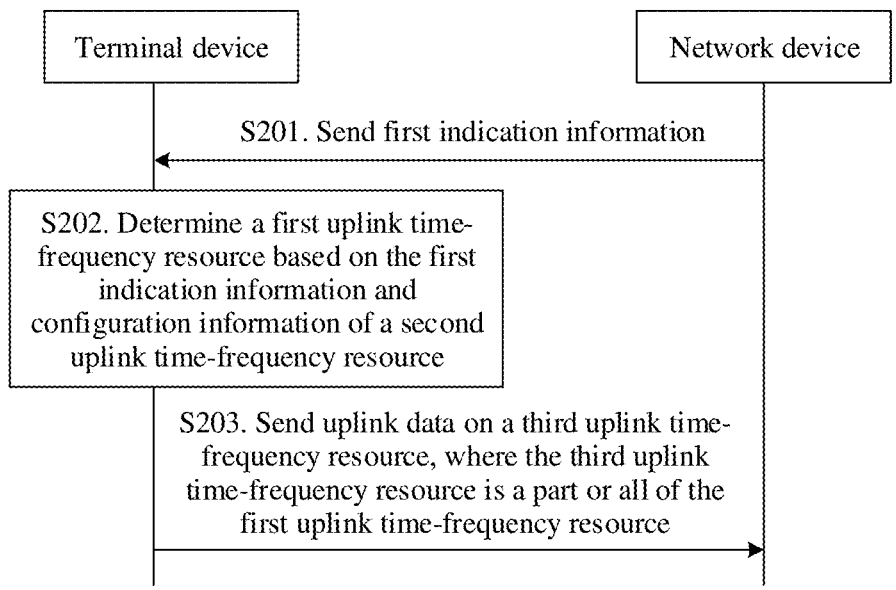
FIG. 9 is a schematic flowchart of uplink data transmission according to an embodiment of this disclosure.

FIG. 9 is a schematic flowchart of an uplink data transmission method according to an embodiment of this disclosure. This embodiment relates to a specific process of uplink data transmission between a network device and a terminal device. As shown in FIG. 9, the method may include S201, S202, and S203.

S201. The network device sends first indication information to the terminal device. Correspondingly, the terminal device receives the first indication information from the network device. For detailed descriptions, refer to step S101 in FIG. 3.

S202. The terminal device determines a first uplink time-frequency resource based on the first indication information and configuration information of a second uplink time-frequency resource, where the first uplink time-frequency resource is a time-frequency resource of an uplink data channel, and the second uplink time-frequency resource is for random access. In this embodiment of this disclosure, there are two types of random access: 2-step random access and 4-step random access. In this embodiment of this disclosure, that the second uplink time-frequency resource is for the 2-step random access is used for description.

Specifically, the first uplink time-frequency resource is a part or all of POs associated with one or more ROs in one or more configuration periodicities. The association relationship is preset by the network device. The configuration periodicity may be a PRACH slot, a PRACH configuration periodicity, an association periodicity between an SSB and an RO, or an association pattern periodicity between an SSB and an RO.

In an optional manner, the second uplink time-frequency resource is a PO, the PO is for carrying uplink data, and the first uplink time-frequency resource is a part or all of the second uplink time-frequency resource. Specifically, the second uplink time-frequency resource is the POs associated with the one or more ROs in the one or more configuration periodicities, and the first uplink time-frequency resource is a part or all of the associated POs. Manners in which the terminal device determines the first uplink time-frequency resource based on the first indication information and the configuration information of the second uplink time-frequency resource include determining manner 1 and determining manner 2.

In another optional manner, the second uplink time-frequency resource is an RO, the RO is for carrying a random access preamble, and the first uplink time-frequency resource is POs associated with a part or all of ROs in the second uplink time-frequency resource. Specifically, the second uplink time-frequency resource is ROs in the one or more configuration periodicities, and the first uplink time-frequency resource may alternatively be understood as a part or all of POs associated with the second uplink time-frequency resource. Manners in which the terminal device determines the first uplink time-frequency resource based on the first indication information and the configuration information of the second uplink time-frequency resource include determining manner 3 and determining manner 4.

Determining manner 1: The first indication information indicates a location of the first uplink time-frequency resource in the second uplink time-frequency resource, and the terminal device determines the first uplink time-frequency resource based on the location of the first uplink time-frequency resource in the second uplink time-frequency resource and the configuration information of the second uplink time-frequency resource. Specifically, Operation 6 and Operation 7 are included.

Operation 6: The terminal device determines the second uplink time-frequency resource based on the configuration information of the second uplink time-frequency resource. For specific descriptions of Operation 6, refer to Operation 1 in step S102.

Operation 7: The terminal device determines the first uplink time-frequency resource based on the location of the first uplink time-frequency resource in the second uplink time-frequency. resource and the second uplink time-frequency resource. Operation 7 includes Case 1 to Case 4.

Case 1: The second uplink time-frequency resource is POs in M consecutive slots. The first indication information indicates that POs in N slots in the M slots are the first uplink time-frequency resource, M and N each are a positive integer, and N is less than or equal to M. In other words, the location of the first uplink time-frequency resource in the second uplink time-frequency resource is the N slots in the M consecutive slots in which the second uplink time-frequency resource is located. In Case 1, manners in which the first indication information indicates the N slots in the M slots include Manner 1.1, Manner 1.2, and Manner 1.3.

Manner 1.1: The N slots are any N slots in the M slots. In this case, the first indication information includes M bits, and each of the M bits corresponds to each of the M slots.

Figure 10:
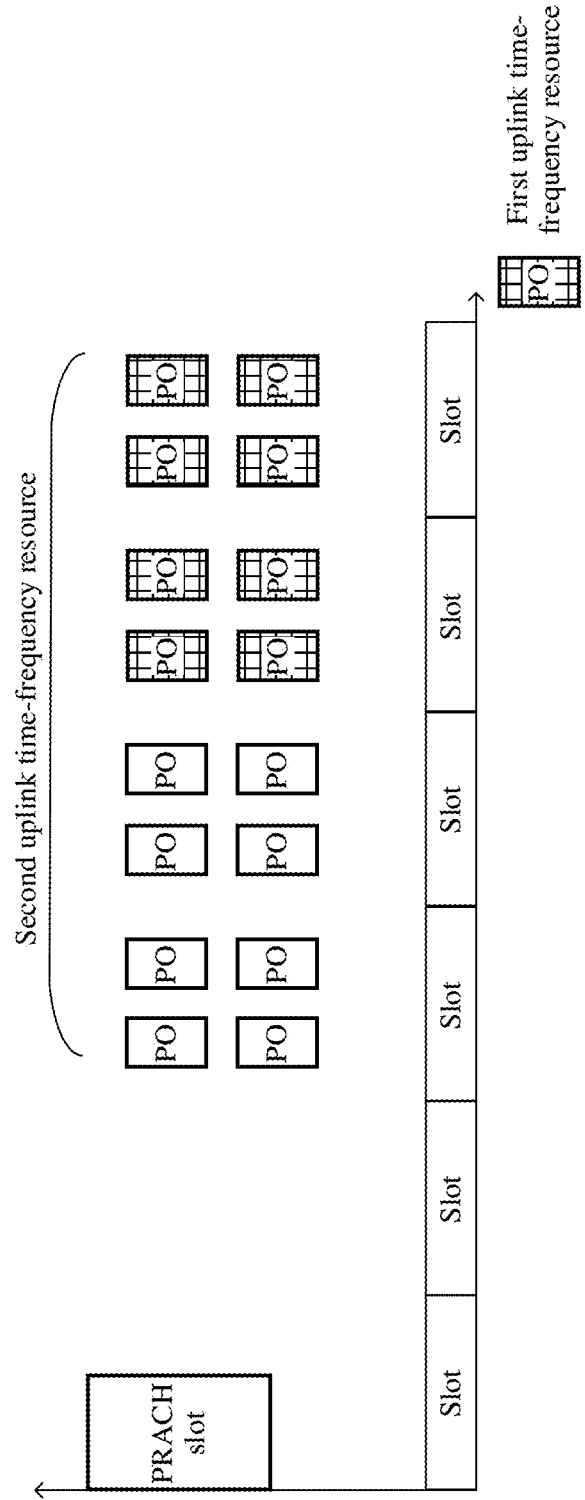
FIG. 10 to FIG. 12 each are a schematic diagram of a 2-step random access resource according to an embodiment of this disclosure.

Example 1: As shown in FIG. 10, a quantity of consecutive slots in which the second uplink time-frequency resource is located is 4, and POs in a $3^{rd}$ slot and a $4^{th}$ slot in the four slots are the first uplink time-frequency resource. The first indication information includes four bits, and each of the four bits corresponds to all POs in each of the four slots. For example, a $1^{st}$ bit corresponds to all POs in a $1^{st}$ slot, a $2^{nd}$ bit corresponds to all POs in a $2^{nd}$ slot, a $3^{rd}$ bit corresponds to all POs in the $3^{rd}$ slot, and a $4^{th}$ bit corresponds to all POs in the $4^{th}$ slot. In an optional manner, values of the four bits are "0011". A value "1" of a bit indicates that POs in a slot that correspond to the bit are the first uplink time-frequency resource; and a value "0" of a bit indicates that POs in a slot that correspond to the bit are not the first uplink time-frequency resource. In another optional manner, values of the four bits are "1100". A value "0" of a bit indicates that POs in a slot that correspond to the bit are the first uplink time-frequency resource; and a value "1" of a bit indicates that POs in a slot that correspond to the bit are not the first uplink time-frequency resource. A person skilled in the art should understand that a correspondence between each of the four bits and each of the four slots may be protocol preset. The correspondence is merely an example. This is not limited in this embodiment of this disclosure.

Manner 1.2: The N slots are N slots that are in a preset order in the M slots. The first indication information includes $\lceil \log_2^N \rceil$ bits, the $\lceil \log_2^N \rceil$ bits indicate a value of N, and $\lceil \cdot \rceil$ indicates rounding up. Specifically, the preset order may be as follows: The N slots are first N slots in the M consecutive slots, or the N slots are last N slots in the M consecutive slots.

Manner 1.3: The N slots are one or more subsets in the M slots. The first indication information includes $M_S$ bits, and each bit corresponds to one subset in $M_S$ subsets. Specifically, the M consecutive slots are divided into $M_S$ subsets in a predefined manner, where $M_S$ is a positive integer. Optionally, the predefined manner may be a manner in which slots included in each subset in the $M_S$ subsets are predefined in a tabular form, or a manner in which the M consecutive slots are divided into $M_S$ subsets according to a predefined rule. The predefined rule may be: All slots whose slot numbers are even numbers form a subset, and all slots whose slot numbers are odd numbers form another subset.

Case 2: The second uplink time-frequency resource is POs in M consecutive slots, and a quantity of time-division multiplexed POs in each of the M slots is P. In other words, the POs in each of the M slots are divided into P groups of POs in time domain. The first indication information indicates that Q groups of POs in the P groups of POs in each of the M slots are the first uplink time-frequency resource, where M, P, and Q each are a positive integer, and Q is less than or equal to P. In other words, the location of the first uplink time-frequency resource in the second uplink time-frequency resource is the Q groups of POs in the P groups of POs in each of the M consecutive slots in which the second uplink time-frequency resource is located. Manners in which the first indication information indicates the Q groups of POs may include Manner 2.1, Manner 2.2, and Manner 2.3.

Manner 2.1: The Q groups of POs are any Q groups of POs in the P groups of POs. In this case, the first indication information includes P bits, and each of the P bits corresponds to each group of POs in the P groups of POs.

Figure 11:
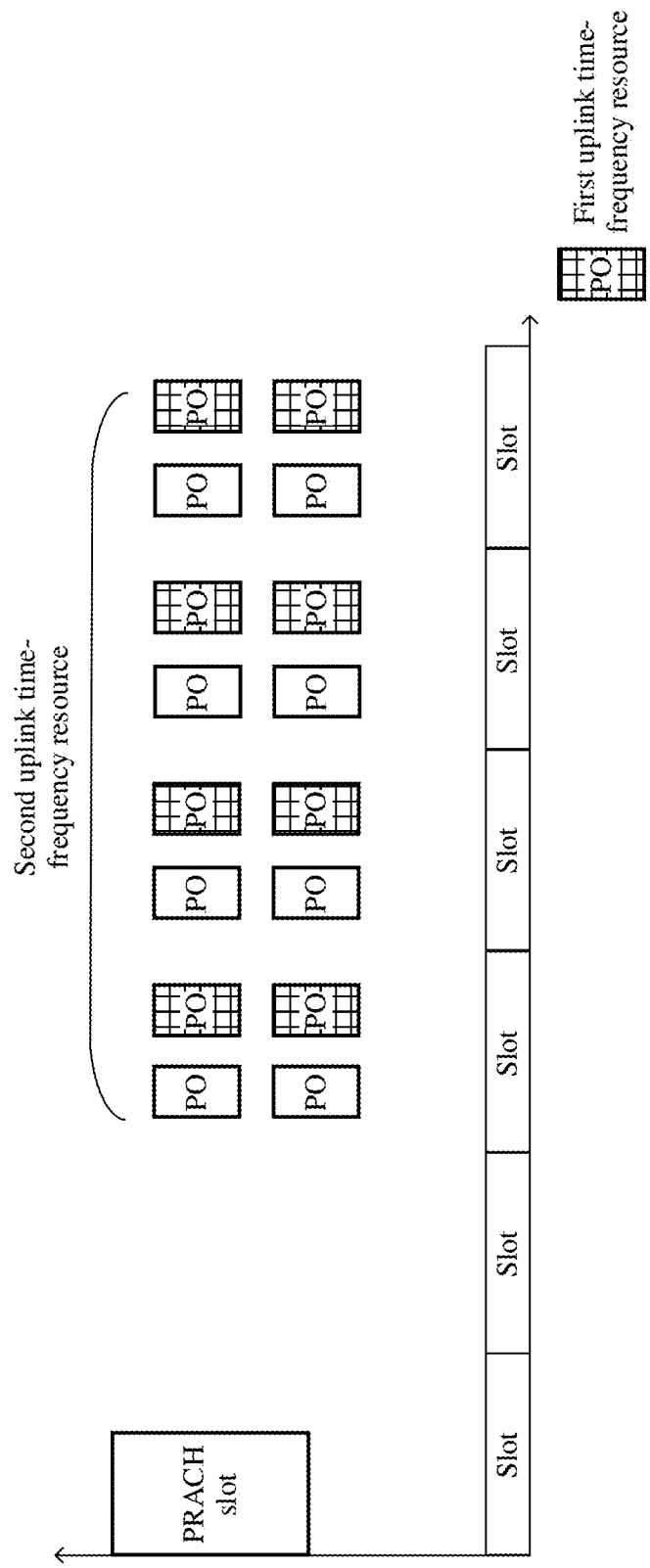

Example 2: As shown in FIG. 11, a quantity of consecutive slots in which the second uplink time-frequency resource is located is 4, and a quantity of time-division multiplexed POs in each of the four slots is 2. In other words, there are two groups of POs in time domain in each of the four slots. The first indication information includes two bits, and each of the two bits corresponds to a group of POs in time domain in each slot. For example, a $1^{st}$ bit corresponds to a first group of POs in time domain in each slot, and a $2^{nd}$ bit corresponds to a last group of POs in time domain in each slot. In an optional manner, values of the two bits are "01". A value "1" of a bit indicates that a group of POs in time domain in each slot that correspond to the bit are the first uplink time-frequency resource; and a value "0" of a bit indicates that a group of POs in time domain in each slot that correspond to the bit are not the first uplink time-frequency resource. In another optional manner, values of the two bits are "10". A value "1" of a bit indicates that a group of POs in time domain in each slot that correspond to the bit are the first uplink time-frequency resource; a value "0" of a bit indicates that a group of POs in time domain in each slot that correspond to the bit are not the first uplink time-frequency resource. A person skilled in the art should understand that a correspondence between each of the two bits and each group of POs in time domain in each slot may be protocol preset. The correspondence is merely an example. This is not limited in this embodiment of this disclosure.

Manner 2.2: The Q groups of POs are Q groups of POs in a preset order in the P groups of POs. The first indication information includes $\lceil \log_2^P \rceil$ bits, and the $\lceil \log_2^P \rceil$ bits indicate a value of P. Specifically, the preset order may be as follows: The Q groups of POs are first Q groups of POs in the P groups of POs, or the Q groups of POs are last Q groups of POs in the P groups of POs.

Manner 2.3: The Q groups of POs are one or more subsets in the P groups of POs. The first indication information includes $P_S$ bits, and the $P_S$ bits indicate that one or more subsets in the $P_S$ subsets are the first uplink time-frequency resource. Specifically, the P groups of POs are divided into $P_S$ subsets in a predefined manner, where $P_S$ is a positive integer. Optionally, the predefined manner may be a manner in which POs included in each subset in the $P_S$ subsets are predefined in a tabular form, or a manner in which the P groups of POs are divided into $P_S$ subsets according to a predefined rule. The predefined rule may be: In the P groups of POs, POs whose index numbers are odd numbers form a subset, and POs whose index numbers are even numbers form another subset.

Case 3: The second uplink time-frequency resource is POs in M consecutive slots, and a quantity of frequency-division multiplexed POs in each of the M slots is U. In other words, the POs in each of the M slots are divided into U groups of POs in frequency domain. The first indication information indicates that V groups of POs in the U groups of POs are the first uplink time-frequency resource, where M, U, and V each are a positive integer, and V is less than or equal to U. Manners in which the first indication information indicates the V groups of POs may include Manner 3.1, Manner 3.2, and Manner 3.3.

Manner 3.1: The first indication information carries U bits, and each of the U bits corresponds to each group of POs in the U groups of POs. The terminal device determines the first uplink time-frequency resource using the U bits.

Manner 3.2: The V groups of POs are V groups of POs in a preset order in the U groups of POs. The first indication information indicates a value of V. Specifically, the preset order may be as follows: The V groups of POs are first V groups of POs in the U groups of POs sorted in ascending order of RB sequence numbers, or the V groups of POs are last V groups of POs in the U groups of POs sorted in ascending order of RB sequence numbers.

Manner 3.3: The V groups of POs are one or more subsets in the U groups of POs.

Specifically, the U groups of POs are divided into Vs subsets in a predefined manner. The first indication information includes Vs bits, and the Vs bits indicate one or more subsets in the Vs subsets.

Case 4: The second uplink time-frequency resource is divided into J groups of POs in time domain, any one group of POs in the J groups of POs include L POs, time-domain locations of the L POs are completely the same, and frequency-domain locations of the L POs are different from each other. In other words, a quantity of frequency-division multiplexed POs in each group of POs in the J groups of POs is L. The first indication information indicates K groups of POs in the J groups of POs, where J, K, and L each are a positive integer, and K is less than or equal to J. Specific indication manners are similar to the indication manners in Example 2, and details are not described herein.

Determining manner 2: The first indication information indicates a DMRS associated with the first uplink time-frequency resource in DMRSs of the second uplink time-frequency resource, the terminal device determines, based on the first indication information and the configuration information of the second uplink time-frequency resource, the DMRS associated with the first uplink time-frequency resource, and the terminal device determines the first uplink time-frequency resource based on the DMRS associated with the first uplink time-frequency resource. Specifically, Operation 6, Operation 8, and Operation 9 are included.

Operation 6: The terminal device determines the second uplink time-frequency resource based on the configuration information of the second uplink time-frequency resource. Specifically, the terminal device determines the DMRS of the second uplink time-frequency resource based on a configuration parameter of the DMRS in the configuration information of the second uplink time-frequency resource. For the configuration parameter of the DMRS, refer to descriptions of Operation 1 in step S102.

Operation 8: The first indication information indicates the DMRS associated with the first uplink time-frequency resource in the DMRSs of the second uplink time-frequency resource, and the terminal device determines, based on the first indication information and the configuration information of the second uplink time-frequency resource, the DMRS associated with the first uplink time-frequency resource. Operation 8 includes Case 5.

Case 5: There are B DMRSs on the second uplink time-frequency resource. The first indication information indicates C DMRSs in the B DMRSs, the C DMRSs are DMRSs associated with the first uplink time-frequency resource, where B and C each are a positive integer, and C is less than or equal to B. Optionally, the DMRSs in Case 5 may be a DMRS sequence or a DMRS port. Manners in which the first indication information indicates the C DMRSs include Manner 5.1, Manner 5.2, and Manner 5.3.

Manner 5.1: The C DMRSs are any C DMRSs in the B DMRSs. The first indication information includes B bits, each of the B bits corresponds to each of the B DMRSs, and the terminal device determines the first uplink time-frequency resource using the B bits.

Manner 5.2: The C DMRSs are C DMRSs in a preset order in the B DMRSs. The first indication information includes $\lceil \log_2^B \rceil$ bits, and the $\lceil \log_2^B \rceil$ bits indicate a value of B.

Specifically, the preset order may be as follows: The C DMRSs are first C DMRSs in the B DMRSs sorted in ascending order of DMRS indexes, or the C DMRSs are last C DMRSs in the B DMRSs sorted in ascending order of DMRS indexes.

Manner 5.3: The C DMRSs are any one or more subsets in the B DMRSs. Specifically, the B DMRSs are divided into $B_S$ subsets in a predefined manner, where $B_S$ is a positive integer. The first indication information indicates one or more subsets in the $B_S$ subsets. Optionally, the predefined manner may be a manner in which DMRSs included in each subset in the $B_S$ subsets are predefined in a tabular form, or a manner in which the B DMRSs are divided into $B_S$ subsets according to a predefined rule. The predefined rule may be: In the B DMRSs, DMRS whose port index numbers are odd numbers form a subset, and DMRS whose port index numbers are even numbers form another subset.

Operation 9: The terminal device determines the first uplink time-frequency resource based on the DMRS associated with the first uplink time-frequency resource and a mapping relationship between the DMRS of the second uplink time-frequency resource and a PO of the second uplink time-frequency resource. The mapping relationship between the DMRS of the second uplink time-frequency resource and the PO of the second uplink time-frequency resource is preset by the network device.

For example, there are four POs on the second uplink time-frequency resource in total: a PO 0, a PO 1, a PO 2, and a PO 3. There are four DMRSs on the second uplink time-frequency resource in total: a DMRS 0, a DMRS 1, a DMRS 2, and a DMRS 3. The mapping relationship between the DMRS of the second uplink time-frequency resource and the PO of the second uplink time-frequency resource is shown in Table 8. The first indication information indicates that the DMRS 1 and the DMRS 2 in the four DMRSs are DMRSs associated with the first uplink time-frequency resource. The terminal device determines, based on Table 8, that the first uplink time-frequency resource is the PO 1 and the PO 2.

TABLE 8

Mapping relationship between a DMRS of the second uplink time-frequency resource and a PO of the second uplink time-frequency resource

| PO | RO |
|---|---|
| PO 0 | DMRS 0 |
| PO 1 | DMRS 1 |
| PO 2 | DMRS 2 |
| PO 3 | DMRS 3 |

When the second uplink time-frequency resource is a PO, the terminal device may alternatively determine the first uplink time-frequency resource in the following manner:

The first indication information indicates an RO associated with the first uplink time-frequency resource in ROs associated with SSBs associated with the second uplink time-frequency resource. The terminal device determines, based on the first indication information and the configuration information of the second uplink time-frequency resource, the RO associated with the first uplink time-frequency resource. The terminal device determines the first uplink time-frequency resource based on the RO associated with the first uplink time-frequency resource and a mapping relationship between a PO of the second uplink time-frequency resource and an RO.

Figure 12:
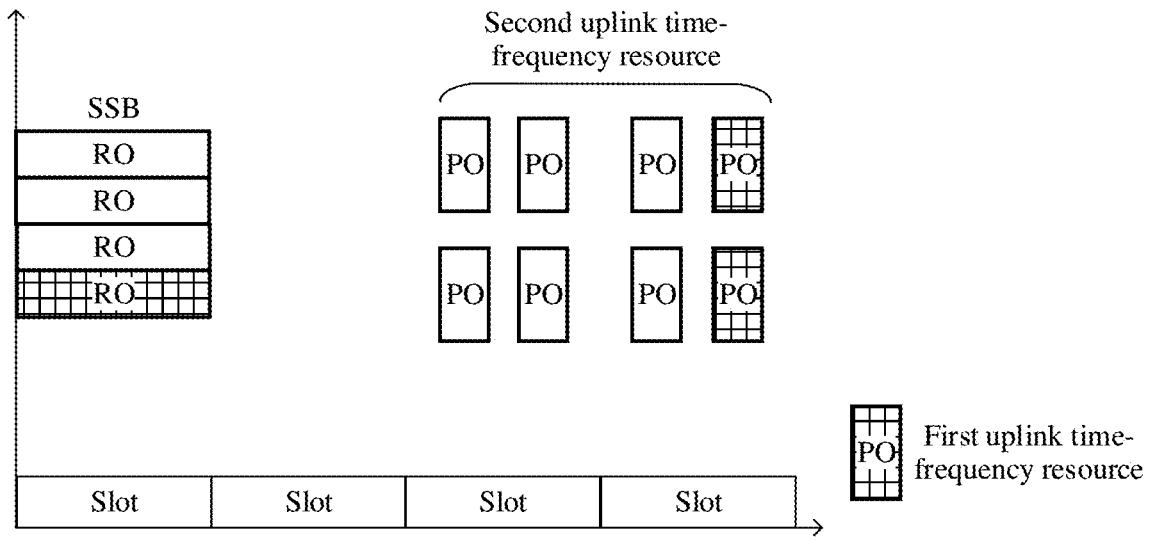

For example, each of the SSBs associated with the second uplink time-frequency resource is associated with G1 ROs. The first indication information indicates H1 ROs in the G1 ROs, and POs associated with the H1 ROs are the first uplink time-frequency resource, where G1 and H1 each are a positive integer, and H1 is less than or equal to G1. Specifically, the first indication information includes G1 bits, and each bit corresponds to one RO of the G1 ROs. The terminal device determines, based on the G1 bits, an RO associated with the first uplink time-frequency resource, and a PO associated with the RO is the first uplink time-frequency resource. For example, as shown in FIG. 12, each SSB associated with the second uplink time-frequency resource is associated with four ROs. The first indication information includes four bits, and each bit corresponds to one RO of the four ROs. The first indication information indicates that a PO associated with one RO of the four ROs is the first uplink time-frequency resource. An example of the mapping relationship between an RO and a PO is shown in Table 8. The terminal device determines the first uplink time-frequency resource based on the mapping relationship and the RO indicated by the first indication information.

Determining manner 3: The first indication information indicates a location, in the second uplink time-frequency resource, of an RO associated with the first uplink time-frequency resource, the terminal device determines, based on the first indication information and the configuration information of the second uplink time-frequency resource, the RO associated with the first uplink time-frequency resource, and the terminal device determines the first uplink time-frequency resource based on the RO associated with the first uplink time-frequency resource. Specifically, Operation 10, Operation 11, and Operation 12 are included.

Operation 10: The terminal device determines the second uplink time-frequency resource based on the configuration information of the second uplink time-frequency resource. For specific descriptions of Operation 10, refer to Operation 3 in step S102.

Operation 11: The first indication information indicates the location, in the second uplink time-frequency resource, of the RO associated with the first uplink time-frequency resource, and the terminal device determines, based on the first indication information and the second uplink time-frequency resource, the RO associated with the first uplink time-frequency resource. Operation 11 includes Case 6 to Case 12.

Case 6: The second uplink time-frequency resource is an RO in a PRACH configuration periodicity, and the PRACH configuration periodicity includes A1 PRACH slots. The first indication information indicates that the location, in the second uplink time-frequency resource, of the RO associated with the first uplink time-frequency resource is B1 PRACH slots in the A1 PRACH slots. In other words, the RO associated with the first uplink time-frequency resource is all ROs in the B1 PRACH slots, where A1 and B1 each are a positive integer, and B1 is less than or equal to A1. Manners in which the first indication information indicates the B1 PRACH slots in the A1 PRACH slots include the following Manner 6.1, Manner 6.2, and Manner 6.3.

Manner 6.1: The B1 PRACH slots are any B1 slots in the A1 PRACH slots. The first indication information includes A1 bits, and each of the A1 bits corresponds to each of the A1 PRACH slots.

Example 6: The second uplink time-frequency resource is all ROs in a PRACH configuration periodicity, there are three PRACH slots in the PRACH configuration periodicity, and the first indication information may indicate one of the three PRACH slots. Specifically, the first indication information carries three bits, and each of the three bits corresponds to one of the three PRACH slots, where the correspondence may be protocol preset. When a value of each bit in the three bits is "1", it indicates that all ROs in a PRACH slot corresponding to the bit are associated with the first uplink time-frequency resource; and when a value of each bit in the three bits is "0", it indicates that all ROs in a PRACH slot corresponding to the bit are not associated with the first uplink time-frequency resource. Alternatively, when a value of each bit in the three bits is "0", it indicates that all ROs in a PRACH slot corresponding to the bit are associated with the first uplink time-frequency resource; and when a value of each bit in the three bits is "1", it indicates that all ROs in a PRACH slot corresponding to the bit are not associated with the first uplink time-frequency resource.

Manner 6.2: The B1 PRACH slots are B1 PRACH slots in a preset order in the A1 PRACH slots. Specifically, the B1 PRACH slots are first B1 PRACH slots in the A1 PRACH slots, or the B1 PRACH slots are last B1 PRACH slots in the A1PRACH slots. The first indication information includes $\lceil \log_2^{B1} \rceil$ bits, and the $\lceil \log_2^{B1} \rceil$ bits indicate a value of B1.

Manner 6.3: The B1 PRACH slots are one or more subsets in the A1 PRACH slots. Specifically, the A1 PRACH slots are divided into $A_S$ subsets in a predefined manner, where $A_S$ is a positive integer. Optionally, the predefined manner may be a manner in which PRACH slots included in each subset in the $A_S$ subsets are predefined in a tabular form, or a manner in which the A1 PRACH slots are divided into $A_S$ subsets according to a predefined rule. The predefined rule may be: All PRACH slots whose slot numbers are even numbers form a subset, and all PRACH slots whose slot numbers are odd numbers form another subset. The first indication information includes $A_S$ bits, and the $A_S$ bits indicate one or more subsets in the $A_S$ subsets.

Case 7: The second uplink time-frequency resource is an RO in a PRACH configuration periodicity, and the PRACH configuration periodicity includes A1 PRACH slots. A quantity of time-division multiplexed ROs in each PRACH slot is C1. In other words, the ROs in each of the A1 slots are divided into C1 groups of ROs in time domain. The first indication information indicates that the location, in the second uplink time-frequency resource, of the RO associated with the first uplink time-frequency resource is D1 groups of ROs in the C1 groups of ROs. In other words, the RO associated with the first uplink time-frequency resource is POs associated with the D1 groups of ROs, where A1, C1, and D1 each are a positive integer, and D1 is less than or equal to C1.

Manner 7.1: The D1 groups of ROs are any D1 groups of ROs in the C1 groups of ROs. The first indication information includes C1 bits, and each of the C1 bits corresponds to each group of ROs in the C1 groups of ROs.

Manner 7.2: The D1 groups of ROs are D1 groups of ROs in a preset order in the C1 groups of ROs. The preset order may be as follows: The D1 groups of ROs are first D1 groups of ROs in the C1 groups of ROs, or the D1 groups of ROs are last D1 groups of ROs in the C1 groups of ROs. The first indication information includes $\lceil \log_2^{D1} \rceil$ bits, and the $\lceil \log_2^{D1} \rceil$ bits indicate a value of D1.

Manner 7.3: The D1 groups of ROs are one or more subsets in the C1 groups of ROs. The C1 groups of ROs are divided into $C_S$ subsets in a predefined manner, where $C_S$ is a positive integer. The first indication information includes $C_S$ bits, and the $C_S$ bits indicate that one or more subsets in the $C_S$ subsets are the first uplink time-frequency resource. For the predefined manner, refer to Manner 2.3 in Case 2.

Case 8: The second uplink time-frequency resource is an RO in a PRACH configuration periodicity, and the PRACH configuration periodicity includes A1 PRACH slots. A quantity of frequency-division multiplexed ROs in each PRACH slot is E1. In other words, the ROs in each of the A1 slots are divided into E1 groups of ROs in frequency domain. The first indication information indicates that the location, in the second uplink time-frequency resource, of the RO associated with the first uplink time-frequency resource is F1 groups of ROs in the E1 groups of ROs in each slot. In other words, the RO associated with the first uplink time-frequency resource is the F1 groups of ROs, where A1, E1, and F1 each are a positive integer, and F1 is less than or equal to E1. For a manner in which the first indication information indicates the F1 groups of ROs in the E1 groups of ROs, refer to Case 3.

Case 9: The second uplink time-frequency resource is an RO in an SSB-RO association pattern periodicity, and there are L1 SSB-RO association periodicities in the SSB-RO association pattern periodicity. The first indication information indicates that the location, in the second uplink time-frequency resource, of the RO associated with the first uplink time-frequency resource is M1 SSB-RO association periodicities in the L1SSB-RO association periodicities. In other words, the RO associated with the first uplink time-frequency resource is ROs in the M1 SSB-RO association periodicities, where L1 and M1 each are a positive integer, and M1 is less than or equal to L1. Methods in which the first indication information indicates the M1 SSB-RO association periodicities in the L1 SSB-RO association periodicities may include Manner 9.1 and Manner 9.2.

Manner 9.1: The L1 SSB-RO association periodicities are any L1 SSB-RO association periodicities in the M1 SSB-RO association periodicities. In this case, the first indication information includes M1 bits, and each of the M1 bits corresponds to each of the M1 SSB-RO association periodicities.

Manner 9.2: The L1 SSB-RO association periodicities are L1 SSB-RO association periodicities in a preset order in the M1 SSB-RO association periodicities. The first indication information includes $\lceil \log_2^{L1} \rceil$ bits, and the $\lceil \log_2^{L1} \rceil$ bits indicate a value of L1. Specifically, the preset order may be as follows: The L1 SSB-RO association periodicities are first L1 SSB-RO association periodicities in the M1 SSB-RO association periodicities, or the L1 SSB-RO association periodicities are last L1 SSB-RO association periodicities in the M1 SSB-RO association periodicities.

In this embodiment of this disclosure, the SSB-RO association pattern periodicity indicates an association pattern periodicity between an SSB and an RO, the SSB-RO association pattern periodicity includes one or more SSB-RO association periodicities, and the SSB-RO association pattern periodicity is repeated once every 160 ms at most. The SSB-RO association periodicity indicates an association periodicity between an SSB and an RO. The SSB-RO association periodicity may be understood as: $T_{PRACH}$ PRACH configuration periodicities starting from a radio frame #0. The PRACH configuration periodicity is one or more PRACH slots, and $T_{RACH}$ is a minimum value that is in a predefined value set and that meets a condition that each SSB in an SSB set is associated with an RO in the association periodicity at least once in the association periodicity. The SSB set may be an SSB set indicated by the network device using an RRC parameter, or may be an SSB set individually configured by the network device for a random access process.

Case 10: The second uplink time-frequency resource is an RO in an SSB-RO association periodicity, and the SSB-RO association periodicity includes N1 PRACH configuration periodicities. The first indication information indicates P1 PRACH configuration periodicities in the N1 PRACH configuration periodicities. The RO associated with the first uplink time-frequency resource is ROs in the P1 PRACH configuration periodicities, where N1 and P1 each are a positive integer, and P1 is less than or equal to N1. For a manner in which the first indication information indicates the P1 PRACH configuration periodicities in the Ni PRACH configuration periodicities, refer to Case 9.

Case 11: The second uplink time-frequency resource is an RO in an SSB-RO association pattern periodicity, and there are Q1 PRACH configuration periodicities in the association pattern periodicity. The first indication information indicates R1 PRACH configuration periodicities in the Q1 PRACH configuration periodicities. In other words, the RO associated with the first uplink time-frequency resource is ROs in the R1 PRACH configuration periodicities, where Q1 and R1 each are a positive integer, and R1 is less than or equal to Q1. For a manner in which the first indication information indicates the R1 PRACH configuration periodicities in the Q1 PRACH configuration periodicities, refer to Case 9.

Case 12: The second uplink time-frequency resource is an RO in an SSB-RO association periodicity, and the association periodicity includes X1 PRACH slots. The first indication information indicates Y1 PRACH slots in the X1 PRACH slots. In other words, the RO associated with the first uplink time-frequency resource is ROs in the Y1 PRACH slots, where X1 and Y1 each are a positive integer, and Y1 is less than or equal to X1. For a manner in which the first indication information indicates the Y1 PRACH slots in the X1 PRACH slots, refer to Case 6.

Operation 12: The terminal device determines the first uplink time-frequency resource based on the RO associated with the first uplink time-frequency resource and a mapping relationship between an RO on the second uplink time-frequency resource and a PO. The mapping relationship between the RO on the second uplink time-frequency resource and the PO is preset by the network device.

For example, there are four ROs on the second uplink time-frequency resource in total: an RO 0, an RO 1, an RO 2, and an RO 3. The mapping relationship between the RO on the second uplink time-frequency resource and the PO is shown in Table 9. When the first indication information indicates the RO 1 and the RO 2, the terminal device determines, based on Table 9, that the first uplink time-frequency resource is the PO 1 and the PO 2.

TABLE 9

Mapping relationship between an RO on the second uplink time-frequency resource and a PO

| PO | RO |
| --- | --- |
| PO 0 | RO 0 |
| PO 1 | RO 1 |
| PO 2 | RO 2 |
| PO 3 | RO 3 |

Determining manner 4: The first indication information indicates a preamble associated with the first uplink time-frequency resource in preambles carried on the second uplink time-frequency resource, the terminal device determines, based on the first indication information and the configuration information of the second uplink time-frequency resource, the preamble associated with the first uplink time-frequency resource, and determines the first uplink time-frequency resource based on the preamble associated with the first uplink time-frequency resource. Specifically, Operation 10, Operation 13, and Operation 14 are included.

For Operation 10, refer to Operation 10 in Determining manner 3.

Operation 13: The first indication information indicates the preamble associated with the first uplink time-frequency resource in the preambles carried on the second uplink time-frequency resource, and the terminal device determines, based on the first indication information and the configuration information of the second uplink time-frequency resource, the preamble associated with the first uplink time-frequency resource. Operation 13 includes Case 13.

Case 13: The second uplink time-frequency resource carries J1 preambles. The first indication information indicates K1 preambles in the J1 preambles. In other words, the K1 preambles are the preamble associated with the first uplink time-frequency resource, where J1 and K1 each are a positive integer, and K1 is less than or equal to J1. Manners in which the first indication information indicates the K1 preambles in the J1 preambles include Manner 13.1, Manner 13.2, and Manner 13.3.

Manner 13.1: The K1 preambles are any K1 preambles in the J1 preambles. The first indication information carries J1 bits, and each of the J1 bits corresponds to each of the J1 preambles.

Manner 13.2: The K1 preambles are K1 preambles in a preset order in the J1 preambles. The first indication information includes $\lceil \log_2^{K1} \rceil$ bits, and the $\lceil \log_2^{K1} \rceil$ bits indicate a value of K1. Specifically, the preset order may be as follows: The K1 preambles are first K1 preambles in the J1 preambles sorted in ascending order of preamble index numbers, or the K1 preambles are last K1 preambles in the J1 preambles sorted in ascending order of preamble index numbers.

Manner 13.3: The K1 preambles are one or more subsets in the J1 preambles. Specifically, the J1 preambles are divided into $J_S$ subsets in a predefined manner, where $J_S$ is a positive integer. The first indication information includes 4 bits, and the 4 bits indicate one or more subsets in the $J_S$ subsets. Specifically, the predefined manner may be a manner in which preambles included in each subset in the $J_S$ subsets are predefined in a tabular form, or a manner in which the J1 preambles are divided into $J_S$ subsets according to a predefined rule. For example, in the J1 preambles, preambles whose preamble index numbers are odd numbers form a subset, and preambles whose preamble index numbers are even numbers form a subset.

Operation 14: The terminal device determines the first uplink time-frequency resource based on the preamble indicated by the first indication information and a mapping relationship between the preamble carried on the second uplink time-frequency resource and a PO.

For example, the second uplink time-frequency resource carries four preambles in total. The mapping relationship between the four preambles and the PO is shown in Table 10. When the first indication information indicates a preamble 1 and a preamble 2, the terminal device determines, based on Table 10, that the first uplink time-frequency resource is a PO 1 and a PO 2.

TABLE 10

Mapping relationship between a preamble carried on the second uplink time-frequency resource and a PO

| PO | Preamble |
| --- | --- |
| PO 0 | Preamble 0 |
| PO 1 | Preamble 1 |
| PO 2 | Preamble 2 |
| PO 3 | Preamble 3 |

When the second uplink time-frequency resource is an RO, the terminal device may alternatively determine the first uplink time-frequency resource in the following manners. The first indication information indicates that E POs in D POs associated with an SSB associated with the second uplink time-frequency resource are the first uplink time-frequency resource, where D and E each are a positive integer, and E is less than or equal to D. Alternatively, the first indication information indicates G DMRSs in F DMRSs associated with an SSB associated with the second uplink time-frequency resource, and a PO associated with the G DMRSs is the first uplink time-frequency resource, where F and G each are a positive integer, and G is less than or equal to F. The DMRS represents a DMRS port or a DMRS sequence. Alternatively, the first indication information indicates V1 preambles in W1 preambles associated with an SSB associated with the second uplink time-frequency resource, and POs associated with the V1 preambles are the first uplink time-frequency resource, where V1 and W1 each are a positive integer, and V1 is less than or equal to W1.

The terminal device may determine the first uplink time-frequency resource in the foregoing manners. This is not limited. Correspondingly, after determining the first indication information and the configuration information of the second uplink time-frequency resource, the network device may determine the first uplink time-frequency resource by using, but not limited to, the foregoing manners in which the terminal device determines the first uplink time-frequency resource, and send the first indication information and the configuration information of the second uplink time-frequency resource to the terminal device.

By implementing the method in step S202, the network device indicates a part of a time-frequency resource (namely, the first uplink time-frequency resource) in a random access resource to the terminal device, and the terminal device may directly send the uplink data to the network device on the first uplink time-frequency resource, without a need to send the preamble on the RO associated with the first uplink time-frequency resource. Configuring a part of the random access resource as a time-frequency resource that can be used to directly transmit uplink data improves spectrum efficiency.

S203. The terminal device sends the uplink data to the network device on a third uplink time-frequency resource. Correspondingly, the network device receives the uplink data from the terminal device on the third uplink time-frequency resource. The third uplink time-frequency resource is a part or all of the first uplink time-frequency resource. For detailed descriptions of the third uplink time-frequency resource, refer to step S103.

The uplink data sent by the terminal device on the third uplink time-frequency resource is uplink data scrambled by the terminal device using a radio network temporary identifier RNTI. For a method for the terminal device to determine the RNTI, refer to step S103.

After receiving the uplink data from the terminal device on the third uplink time-frequency resource, the network device determines a beam for sending feedback information of the uplink data, that is, determines an SSB for sending the feedback information of the uplink data. Optionally, the beam may be further used to receive the uplink data.

The network device determines, based on the third uplink time-frequency resource and an association relationship between the first uplink time-frequency resource and an SSB set, an SSB associated with the third uplink time-frequency resource, where the SSB is for sending the feedback information of the uplink data.

In an optional manner, the association relationship between the first uplink time-frequency resource and the SSB set may be obtained based on an association relationship between a PO for 2-step random access and the SSB set, so that the network device does not need to individually configure the association relationship between the first uplink time-frequency resource and the SSB set for the first uplink time-frequency resource. For example, Table 11 shows an association relationship between the PO for 2-step random access and an SSB in the SSB set.

The association relationship is preconfigured by a network. When the first uplink time-frequency resource is a PO 1 and a PO 2, the association relationship between the first uplink time-frequency resource and the SSB is shown in Table 12. In this case, the network device determines, based on the third uplink time-frequency resource and Table 12, the SSB associated with the third uplink time-frequency resource. When the third uplink time-frequency resource is the PO 2, the SSB associated with the third uplink time-frequency resource is an SSB 2.

TABLE 11

Association relationship between a PO for 2-step random access and the SSB set

| PO | SSB |
| --- | --- |
| PO 0 | SSB 0 |
| PO 1 | SSB 1 |
| PO 2 | SSB 2 |
| PO 3 | SSB 3 |

TABLE 12

Association relationship between the first uplink time-frequency resource and the SSB set

| PO | SSB |
| --- | --- |
| PO 1 | SSB 1 |
| PO 2 | SSB 2 |

In the foregoing implementation, the network device determines, based on the association relationship between the first uplink time-frequency resource and the SSB set, the beam for sending the feedback information of the uplink data, so that data transmission reliability is improved. In addition, the association relationship between the PO for 2-step random access and the SSB set may be reused for the association relationship between the first uplink time-frequency resource and the SSB set, so that the network device does not need to individually configure the association relationship between the first uplink time-frequency resource and the SSB set for the first uplink time-frequency resource. This reduces signaling overheads.

In another optional manner, the network device individually configures the association relationship between the first uplink time-frequency resource and the SSB set for the first uplink time-frequency resource. There are two configuration methods for the network device.

Configuration method 1: The first uplink time-frequency resource is directly associated with the SSB set. For specific descriptions, refer to the method for the network device to configure the association relationship between the first uplink time-frequency resource and the SSB set in step S103.

Configuration method 2: The first uplink time-frequency resource is indirectly associated with the SSB set.

In configuration method 2, the association relationship between the first uplink time-frequency resource and the SSB set is an association relationship between the first uplink time-frequency resource and a PRACH resource, and an association relationship between the PRACH resource and the SSB set. The PRACH resource may be an RO or a preamble in one or more configuration periodicities. The configuration periodicity may be an SSB-RO association pattern periodicity, an SSB-RO association periodicity, a PRACH configuration periodicity, or a PRACH slot.

The association relationship between the first uplink time-frequency resource and the PRACH resource is as follows: Consecutive $N_r$ PRACH resource units in the PRACH resource are associated, in a preset order, with a PUSCH resource unit in the first uplink time-frequency resource. The PRACH resource unit may be an RO or a preamble on an RO. The PUSCH resource unit may be a PO or a DMRS on a PO. The DMRS represents a DMRS port or a DMRS sequence. $N_r$ may be configured by the network device, or may be calculated based on a quantity of PRACH resource units and a quantity of PUSCH resource units. For example, $N_r = \text{ceil}(T_{preamble}/T_{PUSCH})$, where $T_{preamble}$ is the quantity of PRACH resource units in the PRACH resource, and $T_{PUSCH}$ is the quantity of PUSCH resource units in the first uplink time-frequency resource. Optionally, the $N_r$ PRACH resource units with consecutive indexes in the PRACH resource are associated with a PUSCH resource unit in the first uplink time-frequency resource. The PRACH resource units in the PRACH resource are sorted in one or more of the following manners: in ascending order of indexes of preambles of an RO, in ascending order of RO frequency-domain resource indexes, in ascending order of indexes of PO time-domain resources in a PRACH slot, or in ascending order of PRACH slot indexes. The PUSCH resource units in the first uplink time-frequency resource are sorted in one or more of the following manners: in ascending order of PO frequency-domain resource indexes, in ascending order of DMRS port numbers of a PO, in ascending order of DMRS sequence indexes of a PO, in ascending order of indexes of PO time-domain resources in a slot, or in ascending order of slot indexes.

For example, there are two POs on the first uplink time-frequency resource, there are four ROs on the PRACH resource, and $N_r$ is equal to 2. An example of the association between the first uplink time-frequency resource and the PRACH resource is shown in Table 13.

TABLE 13

Association relationship between an RO on the PRACH resource and a PO in the first uplink time-frequency resource

| RO | PO |
| --- | --- |
| RO 0 | PO 0 |
| RO 1 | PO 0 |
| RO 2 | PO 1 |
| RO 3 | PO 1 |

The association relationship between the PRACH resource and the SSB set is an association relationship between an RO on the PRACH resource and an SSB in the SSB set, or an association relationship between a preamble in the PRACH resource and an SSB in the SSB set.

The association relationship between the RO on the PRACH resource and the SSB in the SSB set is as follows: Each RO on the PRACH resource is associated with T2 SSBs with consecutive indexes, or T3 consecutive ROs in the PRACH resource are associated with one SSB, and T2 and T3 each are a positive integer. For example, there are four ROs on the PRACH resource, and T2 is equal to 1. It indicates that each RO is associated with one SSB. The association relationship is shown in Table 14.

TABLE 14

Association relationship between an RO on the
PRACH resource and an SSB in the SSB set

| RO | SSB |
| --- | --- |
| RO 0 | SSB 0 |
| RO 1 | SSB 1 |
| RO 2 | SSB 2 |
| RO 3 | SSB 3 |

An association relationship between a preamble in the PRACH resource and an SSB in the SSB set is as follows: Each preamble in the PRACH resource is associated with T4 SSBs, or T5 consecutive preambles in the PRACH resource are associated with one SSB, where T4 and T5 each are a positive integer. For example, there are 32 preambles on the PRACH resource, and T5 is equal to 16. In other words, 16 consecutive preambles in the PRACH resource are associated with one SSB. The association relationship is shown in Table 15.

TABLE 15

Association relationship between a preamble in
the PRACH resource and an SSB in the SSB set

| Preamble | SSB |
| --- | --- |
| Preamble 0 to preamble 15 | SSB 0 |
| Preamble 16 to preamble 31 | SSB 1 |

The network device determines the association relationship between the first uplink time-frequency resource and the SSB set based on the association relationship between the first uplink time-frequency resource and the PRACH resource and the association relationship between the PRACH resource and the SSB set. For example, the network device may determine the association relationship between the first uplink time-frequency resource and the SSB set based on Table 13 and Table 14. As shown in Table 16, when the third uplink time-frequency resource is a PO 1, the SSB associated with the third uplink time-frequency resource is an SSB 2 and an SSB 3.

TABLE 16

Association relationship between a PO in the first uplink
time-frequency resource and an SSB in the SSB set

| PO | SSB |
| --- | --- |
| PO 0 | SSB 0 |
| PO 0 | SSB 1 |
| PO 1 | SSB 2 |
| PO 1 | SSB 3 |

By implementing the method in configuration method 2, the first uplink time-frequency resource may be associated with more SSBs. For example, the PRACH resource is an RO in a PRACH slot, there are 16 ROs in total in the PRACH slot, the 16 ROs are associated with 16 POs, one PO is associated with one RO, and the first uplink time-frequency resource is four POs of the 16 POs. In this case, if the network device individually configures the relationship between the first uplink time-frequency resource and the PRACH resource (including 16 ROs) for the first uplink time-frequency resource by using the method in configuration method 2, $N_r$ is equal to 4 according to the foregoing formula. In other words, each PO in the first uplink time-frequency resource is associated with four ROs. By implementing the method in configuration method 2, the first uplink time-frequency resource may be associated with more ROs, so that the first uplink time-frequency resource is associated with more SSBs. In this way, the network device and the terminal device can transmit data using more beams, so that data transmission flexibility is improved.

After determining, by using the foregoing method, the SSB associated with the third uplink time-frequency resource, the network device determines, based on the SSB associated with the third uplink time-frequency resource, a transmit beam for the feedback information, and sends the feedback information to the terminal device using the transmit beam. A mapping relationship between an SSB and a beam is configured by the network device or is protocol preset.

The foregoing embodiment provides the uplink data transmission method. The network device indicates, to the terminal device using indication information, a time-frequency resource that is of a random access resource and that may not be used in the random access process. The time-frequency resource may be used to directly transmit the uplink data, so that a resource utilization of the time-frequency resource for random access is improved. In addition, the time-frequency resource that may be used to directly transmit the uplink data is directly or indirectly associated with the SSB, to determine the beam used when the network device receives the feedback information of the uplink data on the time-frequency resource. This improves data transmission reliability.

It may be understood that, to implement functions in the foregoing embodiments, the network device and the terminal device include corresponding hardware structures and/or software modules for performing the functions. A person skilled in the art should easily be aware that, in combination with the units and the method steps in the examples described in embodiments disclosed in this disclosure, these embodiments can be implemented by hardware, software, or a combination of hardware and computer software. Whether a function is performed by hardware, software, or hardware driven by computer software depends on particular application scenarios and design constraints of the technical solutions.

Figure 13:
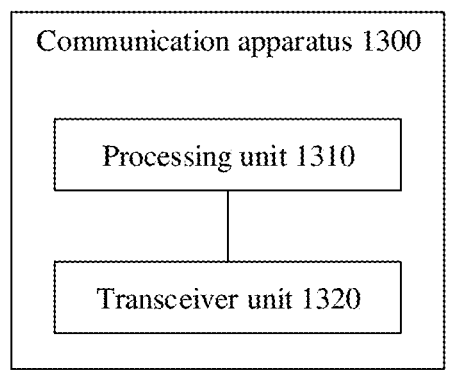
FIG. 13 and FIG. 14 each are a schematic diagram of a structure of a possible communication apparatus according to an embodiment of this disclosure.
Figure 14:
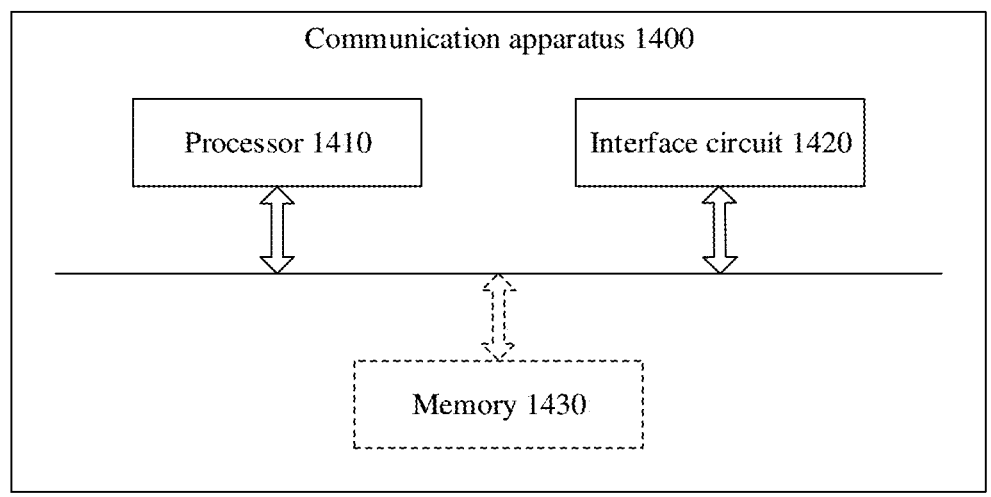

FIG. 13 and FIG. 14 each are a schematic diagram of a structure of a possible communication apparatus according to an embodiment of this disclosure. The communication apparatus may be configured to implement functions of the terminal device or the network device in the foregoing method embodiments. Therefore, beneficial effects of the foregoing method embodiments can also be implemented. In embodiments of this disclosure, the communication apparatus may be the terminal device 120 or the terminal device 130 shown in FIG. 1, may be the radio access network device 110 shown in FIG. 1, or may be a module (for example, a chip) used in the terminal device or the network device.

As shown in FIG. 13, a communication apparatus 1300 includes a processing unit 1310 and a transceiver unit 1320. The communication apparatus 1300 is configured to implement functions of the terminal device or the network device in the method embodiments shown in FIG. 3 and FIG. 9.

When the communication apparatus 1300 is configured to implement a function of the terminal device in the method embodiment shown in FIG. 3, the transceiver unit 1320 is configured to receive first indication information from a network device. The processing unit 1310 is configured to determine a first uplink time-frequency resource based on the first indication information and configuration information of a second uplink time-frequency resource, where the first uplink time-frequency resource is a time-frequency resource of an uplink data channel, and the second uplink time-frequency resource is for random access. The transceiver unit 1320 is further configured to send uplink data to the network device on a third uplink time-frequency resource, where the third uplink time-frequency resource is a part or all of the first uplink time-frequency resource.

When the communication apparatus 1300 is configured to implement a function of the network device in the method embodiment shown in FIG. 3, the transceiver unit 1320 is configured to send first indication information to a terminal device. The processing unit 1310 is configured to determine a first uplink time-frequency resource based on the first indication information and configuration information of a second uplink time-frequency resource, where the first uplink time-frequency resource is a time-frequency resource of an uplink data channel, and the second uplink time-frequency resource is for random access. The transceiver unit 1320 is further configured to receive uplink data from the terminal device on a third uplink time-frequency resource, where the third uplink time-frequency resource is a part or all of the first uplink time-frequency resource.

When the communication apparatus 1300 is configured to implement a function of the terminal device in the method embodiment shown in FIG. 9, the transceiver unit 1320 is configured to receive first indication information from a network device. The processing unit 1310 is configured to determine a first uplink time-frequency resource based on the first indication information and configuration information of a second uplink time-frequency resource, where the first uplink time-frequency resource is a time-frequency resource of an uplink data channel, and the second uplink time-frequency resource is for random access. The transceiver unit 1320 is further configured to send uplink data to the network device on a third uplink time-frequency resource, where the third uplink time-frequency resource is a part or all of the first uplink time-frequency resource.

When the communication apparatus 1300 is configured to implement a function of the network device in the method embodiment shown in FIG. 9, the transceiver unit 1320 is configured to send first indication information to a terminal device. The processing unit 1310 is configured to determine a first uplink time-frequency resource based on the first indication information and configuration information of a second uplink time-frequency resource, where the first uplink time-frequency resource is a time-frequency resource of an uplink data channel, and the second uplink time-frequency resource is for random access. The transceiver unit 1320 is further configured to receive uplink data from the terminal device on a third uplink time-frequency resource, where the third uplink time-frequency resource is a part or all of the first uplink time-frequency resource.

For more detailed descriptions of the processing unit 1310 and the transceiver unit 1320, directly refer to related descriptions in the method embodiments shown in FIG. 3 and FIG. 9. Details are not described herein.

As shown in FIG. 14, a communication apparatus 1400 includes a processor 1410 and an interface circuit 1420. The processor 1410 and the interface circuit 1420 are coupled to each other. It may be understood that the interface circuit 1420 may be a transceiver or an input/output interface. Optionally, the communication apparatus 1400 may further include a memory 1430, configured to store instructions to be executed by the processor 1410, store input data required for running the instructions by the processor 1410, or store data generated after the processor 1410 runs the instructions.

When the communication apparatus 1400 is configured to implement the method shown in FIG. 3 or FIG. 9, the processor 1410 is configured to perform a function of the processing unit 1410, and the interface circuit 1420 is configured to perform a function of the transceiver unit 1320.

When the communication apparatus is a chip used in a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a chip used in a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

It should be noted that the processor in embodiments of this disclosure may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor.

In embodiments of this disclosure, the processor may be a random access memory (RAM), a flash memory, a read-only memory (ROM), a programmable read-only memory (, PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network device or a terminal device. Certainly, the processor and the storage medium may exist in the network device or the terminal device as discrete components.

All or a part of the foregoing embodiments may be implemented by using software, hardware, firmware, or any combination thereof. When software is used to implement embodiments, all or a part of the embodiments may be implemented in a form of a computer program product. The computer program product includes one or more computer programs or instructions. When the computer programs or the instructions are loaded or executed on a computer, all or some of the procedures or functions described in embodiments of this disclosure are generated. The computer may be a general-purpose computer, a dedicated computer, a computer network, a network device, a terminal device, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; may be an optical medium, for example, a DVD; or may be a semiconductor medium, for example, a solid-state drive (SSD).

In embodiments of this disclosure, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that various numbers in embodiments of this disclosure are merely used for differentiation for ease of description, and are not used to limit the scope of embodiments of this disclosure. The sequence numbers of the foregoing processes do not mean an execution sequence, and the execution sequence of the processes should be determined based on functions and internal logic of the processes.

What is claimed is:

1. An uplink data transmission method comprising:
receiving first indication information from a network device;
determining a first uplink time-frequency resource based on the first indication information and configuration information of a second uplink time-frequency resource, wherein the first uplink time-frequency resource is a time-frequency resource of an uplink data channel, and the second uplink time-frequency resource is for random access; and
sending uplink data to the network device on a third uplink time-frequency resource, wherein the third uplink time-frequency resource is a part or all of the first uplink time-frequency resource;
wherein the first indication information comprises an offset value, and the offset value is a time-domain offset value or a frequency-domain offset value of the first uplink time-frequency resource relative to the second uplink time-frequency resource; and
wherein the first indication information further comprises configuration information of the first uplink time-frequency resource, and the determining of the first uplink time-frequency resource based on the first indication information and the configuration information of the second uplink time-frequency resource comprises:
determining the first uplink time-frequency resource based on the offset value, the configuration information of the first uplink time-frequency resource, and the configuration information of the second uplink time-frequency resource.

2. The method according to claim 1, wherein the second uplink time-frequency resource is a physical uplink shared channel occasion, and the physical uplink shared channel occasion is configured to carry uplink data.

3. The method according to claim 1, wherein the second uplink time-frequency resource is a physical random access channel occasion, and the physical random access channel occasion is configured to carry a random access preamble.

4. The method according to claim 1, wherein the configuration information of the first uplink time-frequency resource is a quantity of time-division multiplexed physical uplink shared channel (PUSCH) resources in each of consecutive slots in which the first uplink time-frequency resource is located.

5. An apparatus comprising:
one or more processors; and
a memory having instructions stored thereon that, when executed by the one or more processors, cause the apparatus to at least be configured to:
receive first indication information from a network device;
determine a first uplink time-frequency resource based on the first indication information and configuration information of a second uplink time-frequency resource, wherein the first uplink time-frequency resource is a time-frequency resource of an uplink data channel, and the second uplink time-frequency resource is configured for random access; and
send uplink data to the network device on a third uplink time-frequency resource, wherein the third uplink time-frequency resource is a part or all of the first uplink time-frequency resource;
wherein the first indication information comprises an offset value, and the offset value is a time-domain offset value or a frequency-domain offset value of the first uplink time-frequency resource relative to the second uplink time-frequency resource;
wherein the first indication information further comprises configuration information of the first uplink time-frequency resource; and
wherein in order to determine the first uplink time-frequency resource based on the first indication information and the configuration information of the second uplink time-frequency resource, the apparatus is further configured to determine the first uplink time-frequency resource based on the offset value, the configuration information of the first uplink time-frequency resource, and the configuration information of the second uplink time-frequency resource.

6. The apparatus according to claim 5, wherein the second uplink time-frequency resource is a physical uplink shared channel occasion, and the physical uplink shared channel occasion is configured to carry uplink data.

7. The apparatus according to claim 5, wherein the second uplink time-frequency resource is a physical random access channel occasion, and the physical random access channel occasion is configured to carry a random access preamble.

8. The apparatus according to claim 5, wherein the configuration information of the first uplink time-frequency resource is a quantity of time-division multiplexed physical uplink shared channel (PUSCH) resources in each of consecutive slots in which the first uplink time-frequency resource is located.

9. A non-transitory computer readable medium storing instructions that, when executed by one or more processors, instructs the one or more processors to perform operations of the uplink data transmission method of claim 1.

10. The non-transitory computer readable medium according to claim 9, wherein the second uplink time-frequency resource is a physical uplink shared channel occasion, and the physical uplink shared channel occasion is configured to carry uplink data.

11. The non-transitory computer readable medium according to claim 9, wherein the second uplink time-frequency resource is a physical random access channel occasion, and the physical random access channel occasion is configured to carry a random access preamble.

12. The non-transitory computer readable medium according to claim 9, wherein the configuration information of the first uplink time-frequency resource is a quantity of time-division multiplexed physical uplink shared channel (PUSCH) resources in each of consecutive slots in which the first uplink time-frequency resource is located.

13. An uplink data transmission method comprising:
receiving first indication information from a network device;
determining a first uplink time-frequency resource based on the first indication information and configuration information of a second uplink time-frequency resource, wherein the first uplink time-frequency resource is a time-frequency resource of an uplink data channel, and the second uplink time-frequency resource is for random access; and
sending uplink data to the network device on a third uplink time-frequency resource, wherein the third uplink time-frequency resource is a part or all of the first uplink time-frequency resource;
wherein the first indication information comprises an offset value, and the offset value is a time-domain offset value or a frequency-domain offset value of the first uplink time-frequency resource relative to the second uplink time-frequency resource;
wherein the second uplink time-frequency resource is a physical random access channel occasion, and the physical random access channel occasion is configured to carry a random access preamble;
wherein the determining of the first uplink time-frequency resource based on the first indication information and the configuration information of the second uplink time-frequency resource comprises:
determining the first uplink time-frequency resource based on the offset value, the configuration information of the second uplink time-frequency resource, and configuration information of a physical uplink shared channel occasion.

14. The method according to claim 13, wherein the configuration information of the physical uplink shared channel occasion is reused for other parameters of the first uplink time-frequency resource.

* * * * *